(12) United States Patent
Liu et al.

(10) Patent No.: US 8,001,351 B2
(45) Date of Patent: Aug. 16, 2011

(54) DATA MIGRATION METHOD AND INFORMATION PROCESSING SYSTEM

(75) Inventors: Fuming Liu, Yokohama (JP); Akihiko Sakaguchi, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 824 days.

(21) Appl. No.: 11/594,740

(22) Filed: Nov. 9, 2006

(65) Prior Publication Data
US 2008/0082748 A1 Apr. 3, 2008

(30) Foreign Application Priority Data

Sep. 29, 2006 (JP) ................................. 2006-266379

(51) Int. Cl.
*G06F 12/02* (2006.01)
(52) U.S. Cl. ........................ 711/165; 711/161
(58) Field of Classification Search .................. 711/161, 711/165
See application file for complete search history.

(56) References Cited

U.S. PATENT DOCUMENTS

| | | |
|---|---|---|
| 2002/0156987 A1 | 10/2002 | Gajjar et al. |
| 2003/0046270 A1 | 3/2003 | Leung et al. |
| 2003/0140207 A1 | 7/2003 | Nagase et al. |
| 2004/0148485 A1 | 7/2004 | Suzuki |
| 2004/0230317 A1* | 11/2004 | Kumar et al. ................. 700/1 |
| 2005/0216591 A1 | 9/2005 | Sato |
| 2006/0031636 A1* | 2/2006 | Mizuno .......................... 711/114 |
| 2006/0143418 A1* | 6/2006 | Takahashi et al. ............. 711/165 |
| 2006/0206675 A1* | 9/2006 | Sato et al. ..................... 711/161 |

FOREIGN PATENT DOCUMENTS

EP 1 369 772 A2 10/2003

OTHER PUBLICATIONS

Solaris Volume Manager Administration Guide, Jan. 7, 2006, [online] Retreived from the Internet: <URL: http://web.archive.org/web/20060107110553/http://docs.sun.com/app/docs/doc/817-2530/6mi6gg873?a=view>, chapter 9.*
The Clipper Group Navigator, Sep. 18, 2002; ARKIVIO auto-stor Makes the Most Out of Storage, Analyst: Michael Fisch, pp. 1-4.

* cited by examiner

*Primary Examiner* — Jared I Rutz
(74) *Attorney, Agent, or Firm* — Foley & Lardner LLP

(57) ABSTRACT

A volume group comprising one or a plurality of logical volumes is set. A coexistence avoidance volume group having different array groups can be set to the volume group. Upon execution of preset volume search criteria, a logical volume is specified by carrying out a search in which are excluded array groups to which logical volumes in the coexistence avoidance volume belong.

18 Claims, 27 Drawing Sheets

FIG. 3
| VIRTUAL VOLUME | LOGICAL VOLUME | STORAGE DEVICE IDENTIFIER |
|---|---|---|
| VVOL64A | EVOL163A | 02 |
| VVOL64B | EVOL163B | 02 |
| VVOL64C | EVOL163C | 02 |
301, 302, 303, 300
FIG. 4A
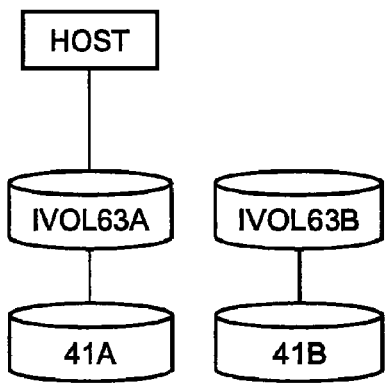
FIG. 4B
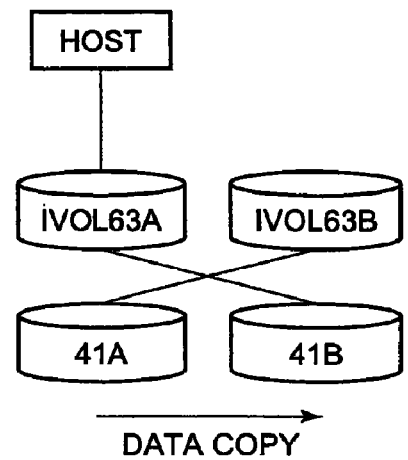
FIG. 5
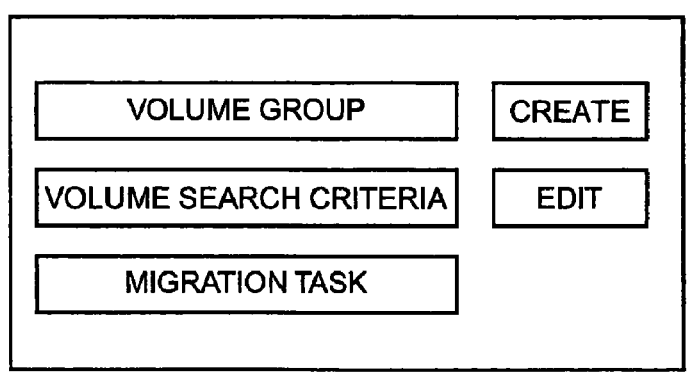

FIG. 7

| VOL | ASSOCIATED VOL | STORAGE SUBSYSTEM | VOLUME NUMBER | ASSIGNMENT STATUS | ATTRIBUTES ||||||| VOLUME GROUP |
| --- | --- | --- | --- | --- | --- | --- | --- | --- | --- | --- | --- | --- |
| | | | | | ARRAY GROUP | CAPACITY | EMULATION TYPE | RESPONSE SPEED | REVOLUTIONS | ACCESS FREQUENCY | DISK TYPE | |
| 71A | | 01 | 00:00 | ASSIGNED | 71 | 1G | OPEN-V | 10ms | 1500 | 1000 | FC | Volume Group1 |
| 71B | | 01 | 00:01 | UNASSIGNED | 71 | 1G | OPEN-V | 10ms | 1500 | | FC | |
| 71C | | 01 | 00:02 | UNASSIGNED | 71 | 1G | OPEN-V | 10ms | 1500 | | FC | |
| 72A | | 01 | 00:03 | ASSIGNED | 72 | 1G | OPEN-V | 50ms | 1500 | 1000 | Other | Volume Group2 |
| 72B | | 01 | 00:04 | UNASSIGNED | 72 | 1G | OPEN-V | 50ms | 1500 | | Other | |
| 72C | | 01 | 00:05 | UNASSIGNED | 72 | 1G | OPEN-V | 50ms | 1500 | | Other | |
| 73A | | 01 | 00:06 | ASSIGNED | 73 | 1G | OPEN-V | 10ms | 1500 | | FC | |
| 73B | | 01 | 00:07 | UNASSIGNED | 73 | 1G | OPEN-V | 10ms | 1500 | | FC | |
| 73C | | 01 | 00:08 | UNASSIGNED | 73 | 1G | OPEN-V | 10ms | 1500 | | FC | |
| 74A | | 01 | 00:09 | UNASSIGNED | 74 | 1G | OPEN-V | 100ms | 1500 | | SATA | |
| 74B | | 01 | 00:0A | UNASSIGNED | 74 | 1G | OPEN-V | 100ms | 1500 | | SATA | |
| 74C | | 01 | 00:0B | UNASSIGNED | 74 | 1G | OPEN-V | 100ms | 1500 | | SATA | |
| 75A | 81A | 01 | | ASSIGNED | | | | | | | | |
| 75B | 81B | 01 | | ASSIGNED | | | | | | | | |
| 75C | 81C | 01 | | UNASSIGNED | | | | | | | | |
| 76A | 82A | 01 | | UNASSIGNED | | | | | | | | |
| 76B | 82B | 01 | | UNASSIGNED | | | | | | | | |
| 76C | 83C | 01 | | UNASSIGNED | | | | | | | | |
| 81A | | 02 | 00:0C | ASSIGNED | 75 | 1G | OPEN-V | 100ms | 800 | | Other | |
| 81B | | 02 | 00:0D | ASSIGNED | 75 | 1G | OPEN-V | 100ms | 800 | | Other | |
| 81C | | 02 | 00:0E | UNASSIGNED | 75 | 1G | OPEN-V | 100ms | 800 | | Other | |
| 82A | | 02 | 00:0F | UNASSIGNED | 76 | 1G | OPEN-V | 150ms | 800 | | SATA | |
| 82B | | 02 | 00:10 | UNASSIGNED | 76 | 1G | OPEN-V | 150ms | 800 | | SATA | |
| 82C | | 02 | 00:11 | UNASSIGNED | 76 | 1G | OPEN-V | 150ms | 800 | | SATA | |

FIG. 8

| HOST | APPLICATION | LOGICAL VOLUME |
|---|---|---|
| H001 | APPLICATION 1 | 71A |
| H002 | APPLICATION 2 | 72A |

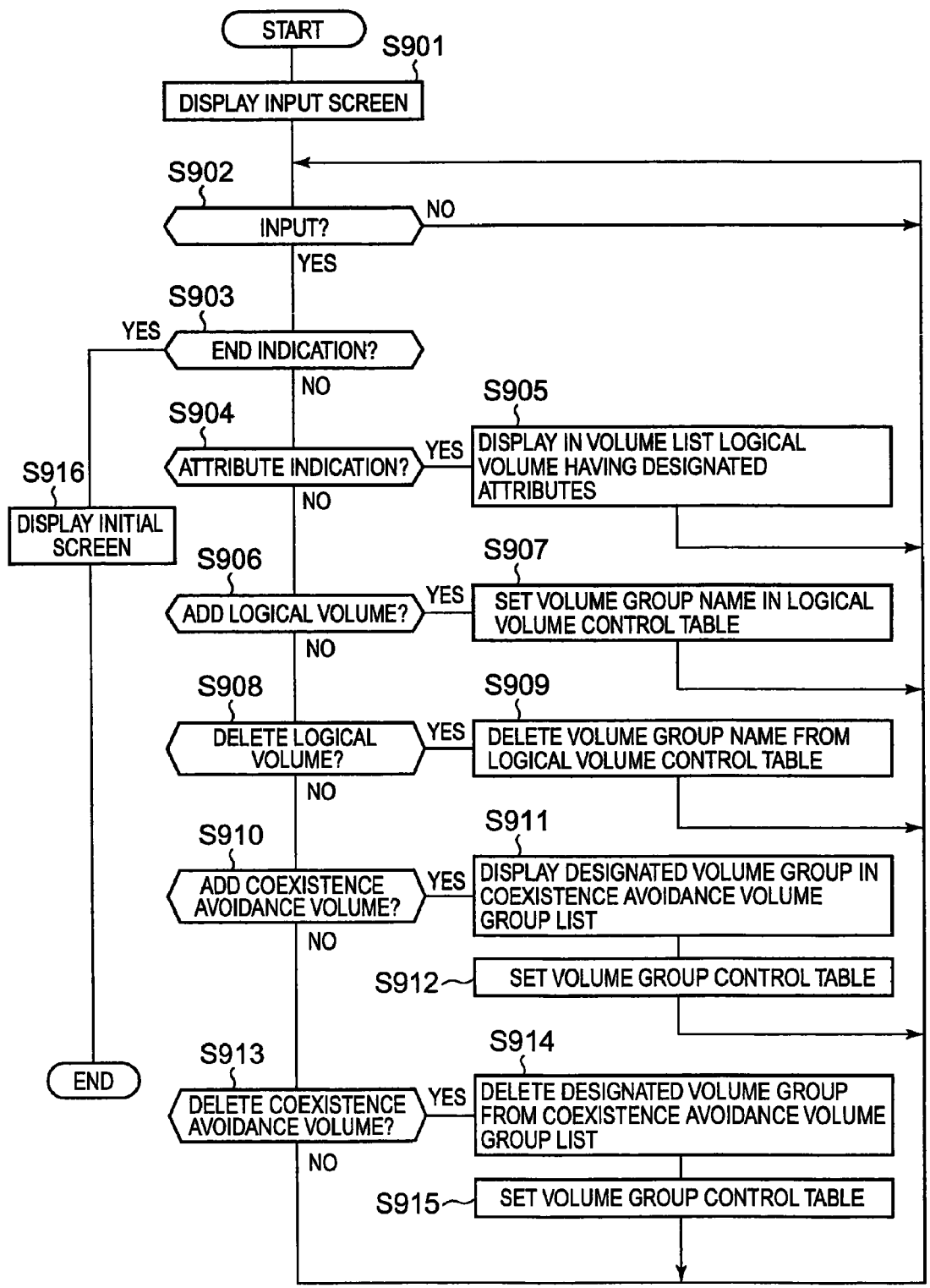

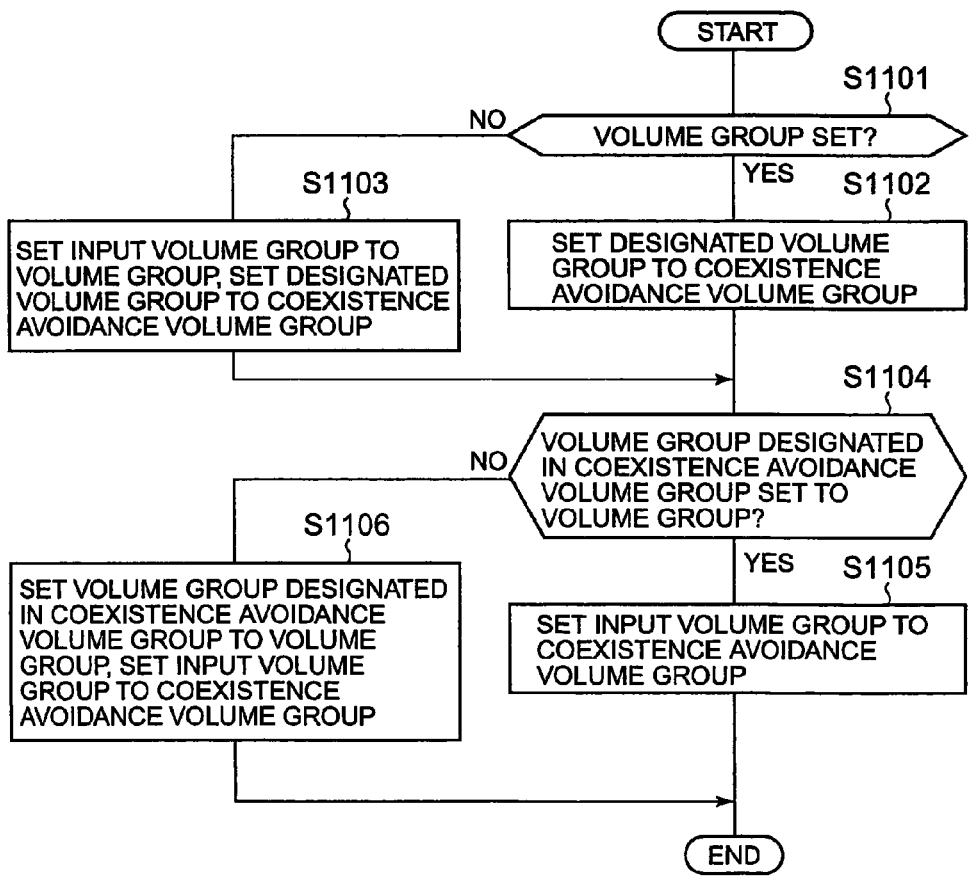

FIG. 15

| VOLUME SEARCH CRITERIA | SEARCH CRITERIA |
|---|---|
| STORAGE TIER 1 | DISK TYPE =FC |
| STORAGE TIER 2 | STORAGE SYSTEM 1=NO |
| STORAGE TIER 3 | (DISK TYPE =SATA) OR (DISK TYPE=FC) |

FIG. 19

| TASK 1901 | VOLUME GROUP 1902 | VOLUME SEARCH CRITERIA 1903 | TASK EXECUTION TIMING 1904 | SOURCE VOLUME 1905 | TARGET VOLUME 1906 |
|---|---|---|---|---|---|
| Task 1 | Volume Group 1 | STORAGE TIER 1 | IMMEDIATE EXECUTION | 71A | 73A |
|  |  |  |  | 71B | 73B |
|  |  |  |  | 71C | 73C |
| Task 2 | Volume Group 2 | STORAGE TIER 3 | IMMEDIATE EXECUTION | 72A | 76A |

| CATEGORY | MAIN VOLUME | SECONDARY VOLUME |
|---|---|---|
| COPY | IVOL71A | IVOL71B |
| COPY | IVOL71A | IVOL71C |
| COPY | IVOL71B | IVOL72B |
| COPY | IVOL72B | VVOL75A |
| COPY | VVOL75A | VVOL75B |
| SNAPSHOT | IVOL72B | IVOL74B<br>IVOL74C |

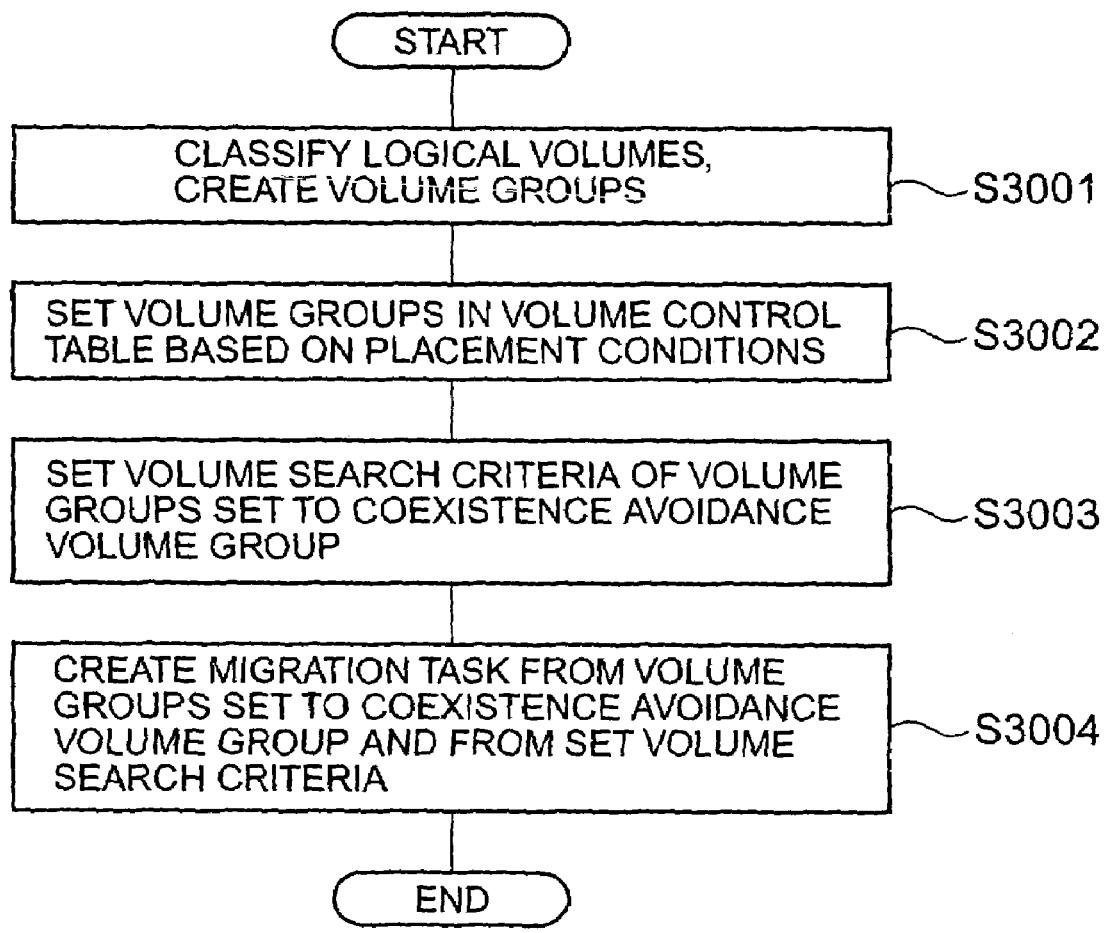

DATA MIGRATION METHOD AND INFORMATION PROCESSING SYSTEM

CROSS-REFERENCE TO PRIOR APPLICATION

This application relates to and claims priority from Japanese Patent Application No. 2006-266379, filed on Sep. 29, 2006 the entire disclosure of which is incorporated herein by reference.

BACKGROUND

The present invention relates to a storage device, and more particularly to a storage device which can operate suitably even when data stored in a storage area of the storage device is stored in another storage area.

Applications providing web services have undergone a fast evolution in the wake of the dramatic development in Internet technology of recent years. The volume of operational data handled by the applications themselves has also seen a rapid increase. The access frequency by the application and the utility value of such operational data change over time. There are instances where access frequency changes widely in accordance with the usage status of the web service. The reliability required from such operational data varies also depending on the type of the web service being provided. Data life cycle is defined as the series of stages from creation of such operational data, through use and storage, up to data elimination. In order for applications to be able to provide better web services with limited storage resources, operational data must be stored by selecting optimal storage in accordance with the essential requirements (usage value, performance, reliability) of the operational data of the application, at every stage of the life cycle of the operational data.

Thanks to storage network technologies developed in recent years, typified by SAN, it has become possible to centralize and mange heterogeneous and varied storage schemes in storage network environments. In addition, other large-capacity storage devices incorporating low-cost storage devices such as S-ATA have come into the market, bringing in their wake more variety as regards storage resource reliability and characteristics such as performance and the like. As a result, it has become possible to store operational data by selecting an optimal storage scheme in accordance with the essential requirements of the operational data of applications, at every stage of the life cycle of the operational data. At the same time, methods have been proposed for migrating data in accordance with data usage frequency, in which when data usage frequency in a same storage subsystem exceeds a certain threshold value, the relevant data are migrated to a high-performance volume in the same storage subsystem, and conversely, when data usage frequency in a same storage subsystem drops below a certain threshold value, the relevant data are migrated to a low-performance volume in the same storage subsystem (see, for instance, Japanese Patent Application Laid-open No. 2003-216460). Other methods have also been proposed for migrating data, in accordance with data usage, between different types of storage subsystems, in which when data usage frequency exceeds a certain threshold value, the relevant data are migrated to volumes of a high-performance storage subsystem, and conversely, when data usage frequency drops below a certain threshold value, the relevant data are migrated to volumes of a low-performance storage subsystem (see, for instance, Japanese Patent Application Laid-open No. 2005-276017).

SUMMARY

Conventional data migration methods, however, have focused only on data performance requirements, but not on data reliability or data migration efficiency. When volumes in which pairs are formed are moved for backup, for instance, the volumes may end up migrating to a same array group. As a result, the two volumes making up a pair might become-inaccessible in case of failure of the array group.

When a primary volume is written on, moreover, a secondary volume is also written on, so that if the primary volume and the secondary volume are placed in a same array group, the I/O load of the array group increases abruptly.

In order to solve the above problems during migration of data stored in a logical volume, logical volumes located in different array groups are designated so that logical volumes belonging to array groups other than the array groups to which the designated logical volumes belong are taken as data migration destinations.

This allows defining volume groups, which are sets of plural logical volumes, migrating data by volume group units, and placing data in different array groups by volume group units.

It becomes also possible to extract plural logical volumes belonging to a same array group, and to re-locate data of the extracted logical volumes in different array groups.

BRIEF DESCRIPTION OF THE DRAWINGS

FIG. 3 is a diagram illustrating an example of a mapping table;

FIG. 4 is a diagram for explaining a migration operation;

FIG. 5 is a diagram illustrating a display example of an initial screen;

FIG. 7 is a diagram illustrating an example of a logical volume control table;

FIG. 8 is a diagram illustrating an example of an application-volume control table;

FIG. 9 is a diagram illustrating an example of a process in a volume group management program;

FIG. 10 illustrates an example of a volume group control table;

FIG. 11 is a diagram illustrating an example of a process in the volume group management program;

FIG. 15 illustrates an example of a volume search criteria table;

FIG. 19 is a diagram illustrating an example of a task control table;

FIG. 27 is a diagram illustrating an example of a copy control table;

FIG. 30 is a diagram illustrating an example of a process in the migration task management program;

DESCRIPTION OF THE PREFERRED EMBODIMENTS

Figure 1:
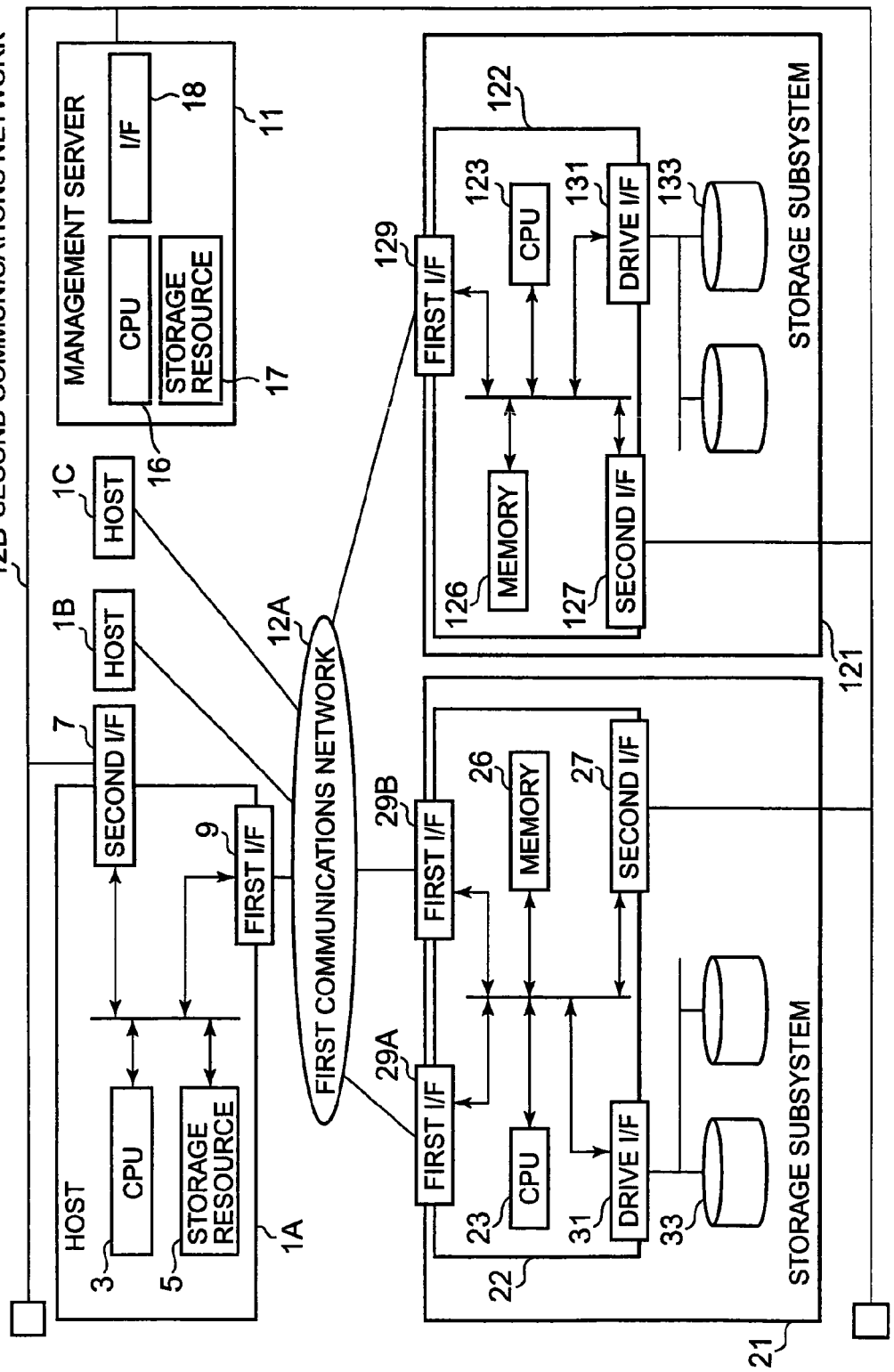
FIG. 1 is a diagram illustrating the configuration of an information processing system.

FIG. 1 illustrates an example of the configuration of an information processing system.

In this system, a plurality of hosts 1A, 1B and 1C, and a plurality of storage subsystems 21 and 121 are connected to a first communications network 12A. Also, the hosts 1A, 1B and 1C, the storage subsystems 21 and 121, and a management server 11 are connected to a second communications network 12B.

The communications networks 12A and 12B are depicted herein as two connected communications networks, but they can also be connected as a single communications network. The communications networks 12A and 12B may be any kind of communications network. For instance, the first communications network 12A may be a SAN (Storage Area Network), and the second communications network 12B may be a LAN (Local Area Network).

Each host 1A, 1B and 1C is a computer for sending I/O commands (input/output commands) for writing data to logical volumes (logical storage areas) of the storage subsystems 21 and 121, or for reading data from the logical volumes. The hosts 1A, 1B and 1C may comprise the same hardware configuration or different hardware configurations. The hosts are assumed herein to have the same hardware configuration, which will be explained taking the host 1A as an example.

The host 1A comprises a storage resource 5 (for instance, a semiconductor memory or a hard disk drive) that can store data, a CPU 3 for reading and processing programs and data stored in the storage resource 5, a plurality of first I/F 9 being communications interfaces (hereinafter, I/F) of the first communications network 12A, and a second I/F 7 being a communications interface of the second communications network 12B. The I/F 7 and 9 are for instance a communications port or a communications controller (for instance, a host bus adapter or a LAN controller) comprising a communications port.

The management server 11 has a storage resource 17 such as a semiconductor memory or a hard disk drive, for storing programs and/or data, a CPU 16 for executing processes on the basis of programs and/or data stored in the storage resource 17, and an I/F 18 being a communications interface of the second communications network 12B. In this configuration, upon receipt of a designation of a volume group (a set of one or several logical volumes) and of volume search criteria, the management server 11 issues an instruction to the storage subsystem 21 or 121 for migrating data of the logical volumes belonging to the designated volume group to logical volumes selected on the basis of the volume search criteria.

The storage subsystem 21 and the storage subsystem 121 are connected by the first communications network 12A, but they may also be connected via another communications-enabled dedicated line. The storage subsystem 21 and the storage subsystem 121 may have a same or different hardware configuration. A hardware configuration example of the storage subsystems will be explained assuming herein an identical hardware configuration for the storage subsystems.

The storage subsystems 21 and 121 comprise a plurality of media drives 33 and 133 that can be configured as RAIDs (Redundant Array of Independent (or Inexpensive) Disks). The media drives 33 and 133 maybe, for instance, a hard disk device, an optical disk device, or a semiconductor memory such as a flash memory, a RAM, a ROM or the like, or anyone of the foregoing or a combination thereof. In addition to the media drives 33 and 133, the storage subsystems 21 and 121 comprise controllers 22 and 122.

The controllers 22 and 122 are devices for controlling the operation of the storage subsystems 21 and 121. The controllers 22 and 122 comprise respectively one or more first I/F 29 and 129 as I/F of the first communications network 12A, second I/F 27 and 127 as I/F of the second communications network 12B, and drive I/F 31 and 131 for controlling communications with the respective media drives 33 and 133. The controllers 22 and 122 comprise respectively a memory 26 and 126 and a CPU 23 and 123. Herein the controllers comprise each one memory and one CPU, but they may comprise each plural memories and plural CPUs. The memories 26 and 126 comprise respectively, for instance, cache areas capable of temporarily storing data exchanged between the media drives 33 and 133 and the hosts 1A, 1B and 1C, or between different storage subsystems, and control areas capable of storing data and/or computer programs for controlling the storage subsystems 21 and 121. The CPUs 23 and 123 can read and execute programs such as copy control programs or the like stored in the control areas.

The controller 22 thus exemplified may be configured differently. In another configuration, for instance, the controller 22 may comprise a plurality of first control units for controlling communications with an external device (for instance, a host or the storage subsystem 121), a plurality of second control units for controlling communications with the media drive 33, a cache memory capable of storing data exchanged between an external device and the media drive 33, a control memory for storing data and/or programs for controlling the storage subsystem 21, and a connecting unit (for instance, a switch such as a crossbar switch or the like) for connecting the first control units, the second control units, the cache memory and the control memory. In this case, controller processing is carried out by the first control unit and the second control unit. The same applies to the controller 122.

Figure 2:
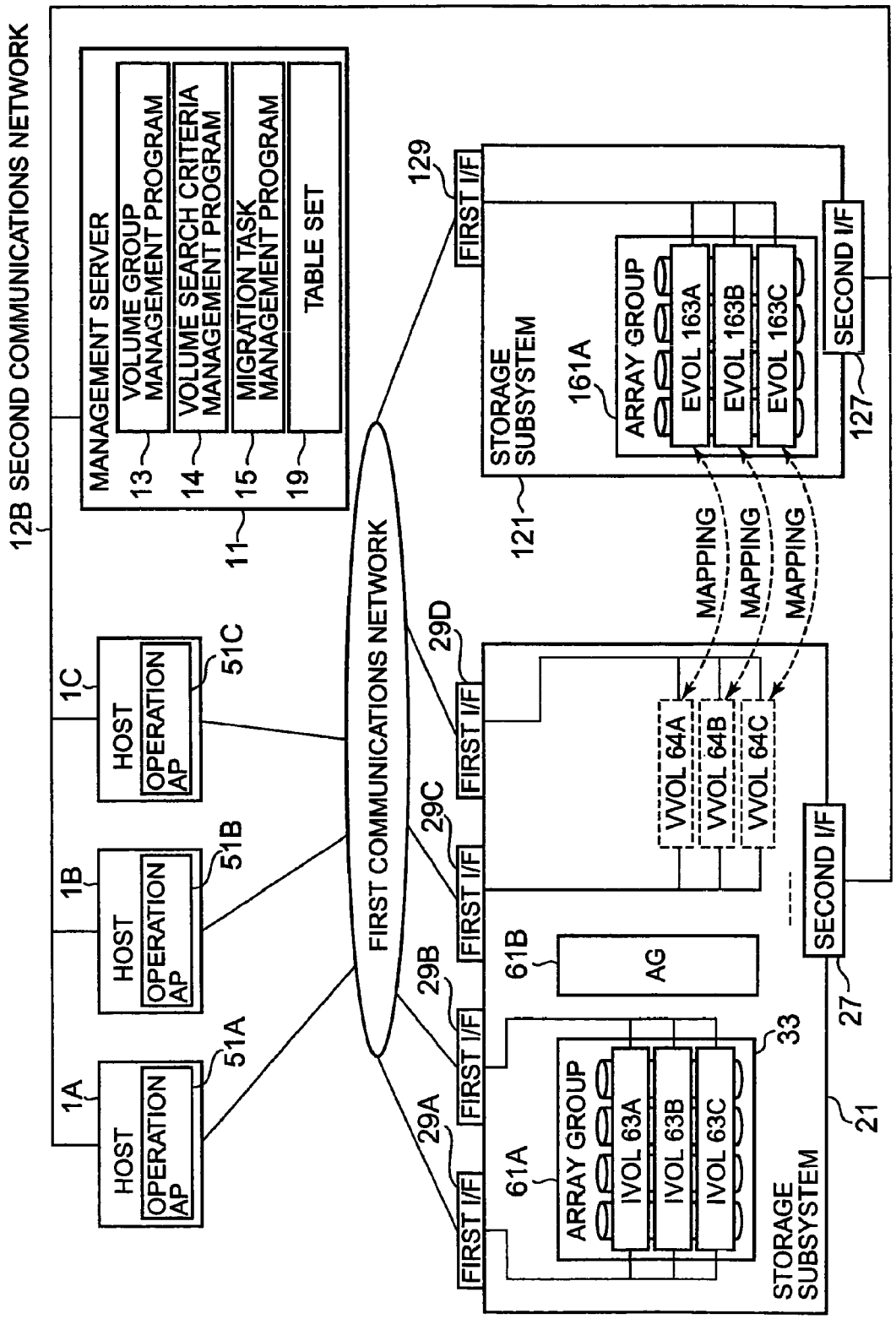
FIG. 2 is a diagram illustrating the logical configuration of an information processing system.

FIG. 2 illustrates an example of the logical configuration of the information processing system illustrated in FIG. 1.

The hosts will be explained first.

In the storage resource 5 of each host 1A, 1B and 1C is stored respectively at least one operation application program (hereinafter, operation AP) 51A, 51B and 51C. The CPU 3 reads the operation AP stored in the storage resource and executes predetermined operations.

The operation AP 51A, 51B and 51C are, for instance, programs for providing web services or a database to a client. The operation AP 51A, 51B and 51C issue data-writing, data-reading I/O commands for the logical volumes of the storage subsystem 21.

The storage subsystems are explained next.

The storage subsystem 21 can comprise plural (or one) array groups 61A and 61B. Each array group 61A and 61B comprises one or plural media drives 33 installed in the storage subsystem 21. In case of a RAID with four media drives 33, for instance, one such array group comprises four media drives 33. The RAID may comprise media drives 33 of identical type and capacity, or media drives 33 of different type and capacity.

The storage subsystem 21 can comprise plural logical volumes (VOL). A logical volume is an accessible logical storage area recognized by each host 1A, 1B and 1C and supplied by the controller 22. The logical volumes supplied by the controller 22 include (actual) logical volumes 63A, 63B and 63C (hereinafter, "internal volumes (IVOL)") having physical storage areas in the storage subsystem 21 where logical volumes are provided, and (non-actual) logical volumes 64A, 64B and 64C (hereinafter, "virtual volumes (VVOL)") having no physical storage areas in the storage subsystem 21 where logical volumes are provided.

The internal volumes 63A, 63B and 63C are logical partitions of storage areas in the array group 61A. In case of a RAID with four media drives, the four media drives are partitioned in stripes such that the storage capacity of one internal volume is determined by combining the storage areas of the respective partitioned media drives. Of course, an internal volume may also be one storage area partition from one partitioned media drive.

The configuration of the virtual volumes 64A, 64B and 64C is independent from the presence or absence of a physical storage resource. The virtual volumes 64A, 64B and 64C can be mapped to respective logical volumes (external volumes (EVOL)) 163A, 163B and 163C) supplied by another storage subsystem 121. To this end the mapping table 300 illustrated in FIG. 3 is stored in the memory 26 of the controller 22.

FIG. 3 illustrates an example of a mapping table. In the mapping table 300 are set virtual volumes 301, logical volumes 302 mapped to the virtual volumes, and identifiers 303 of a storage subsystem having logical volumes.

Although FIG. 3 illustrates an example in which one logical volume (external volume) is mapped to one virtual volume, plural external volumes may also be mapped to one virtual volume, or plural virtual volumes may be mapped to one external volume. In case of such mapping, when an access request (I/O command) for VVOL 64A is received from the host 1A, the controller 22 checks the mapping table 300, and when it determines access for the virtual volume VVOL64A, issues an IO command to the storage subsystem 121 having the external volume (EVOL 164). The host 1A can thus access EVOL164A in the external storage system 121 by accessing VVOL64A via the storage system 21.

The storage subsystem 21 can perform data migration within the storage subsystem 21 or with another storage subsystem 121.

FIG. 4 illustrates an example of data migration.

On receipt of a data migration instruction from the server, together with an indication of a logical volume of the migration source and a logical volume of the migration target, the controller 22 performs migration of data from the logical volume of the migration source to the logical volume of the migration target, and changes thereafter the identifiers of the logical volumes.

FIG. 4A illustrates a situation prior to data migration. Herein, the host is mapped to the internal volume (IVOL63A), and the internal volume IVOL63A is mapped to a storage area (physical storage area) 41A. An internal volume IVOL63B is mapped to a storage area 41B of a media drive.

FIG. 4B illustrates a data migration state.

In the situation of FIG. 4A, upon receipt from the management server 11 of a data migration instruction with IVOL63A as the logical volume of the migration source and IVOL64 as the logical volume of the migration target, the controller 22 copies data stored in the storage area 41A to the storage area 41B, and once copying is over, modifies the mapping between the internal volumes and the storage areas of the media drive. That is, the storage area 41A is mapped to the internal volume IVOL63B, and the storage area 41B to the internal volume IVOL63A. As a result, the storage position of physical data can be modified without changing the mapping between the host 1A and the internal volumes. Upon receipt of a data writing request from the host 1A while data is being copied from the storage area 41A to the storage area 41B, the controller 22 writes data on both storage areas. As a result, the storage position of physical data can be modified without interrupting access from the host.

Although FIG. 4 illustrates data migration among internal volumes, data migration between external volumes can also be carried out similarly.

For instance, in case of migration of data stored in the virtual volume 64A to the virtual volume 64B in FIG. 2, data stored in the external volume 163A can be copied to the external volume 163B, followed by mapping modification for the virtual volumes and the external volumes once copying is over.

In case of migration of data stored in the virtual volume 64A to the external volume 163B, data stored in the external volume 163A mapped to the virtual volume 64A is copied to the external volume 163B, followed by mapping modification for the virtual volumes and the external volumes once copying is over.

In case of migration of data stored in the virtual volume 64A to the internal volume 63B, data stored in the external volume 163A is copied to the internal volume 63B, followed by mapping update between the virtual volume and the internal volume once copying is over.

The data migration explained herein includes both instances where data is erased from the storage area of the migration source (copy source) after migration and instances where such data is not erased after migration.

The management server 11 is explained next.

In the storage resource 17 of the management server 11 are stored a volume group management program 13, a volume search criteria management program 14, a migration task management program 15, and a table set 19 that is used in the processing by the respective programs. The various tables stored in the table set 19 are explained next.

The volume group management program 13 is a program for defining volume groups. A volume group is a set of one logical volume or of plural logical volumes. Administrator load is thus eased by defining volume groups so that plural logical volumes can be managed together.

In the volume group definition can be set a volume group (coexistence avoidance volume group) having an array group different from that of the defined volume group. Upon defining a volume group including IVOL63A illustrated in FIG. 2 and setting a volume group including IVOL63B as a coexistence avoidance volume group, for instance, the data of IVOL63A is stored in a logical volume of an array group different from an array group 61A. In this case IVOL63A and IVOL63B form a pair, such that the data of IVOL63A and the data of IVOL63B can be placed in a different array group; even if the first array group fails, therefore, the data can be read from the second array group, thereby affording increased reliability. Even in case of high access frequency to IVOL63A and IVOL63B, access to the array groups can be distributed by keeping the array groups separate, which allows enhancing performance.

The volume search criteria management program 15 is a program for establishing the conditions (volume search criteria) for specifying a logical volume requested by the administrator among the plural volume groups in the storage subsystem.

The migration task management program 16 is a program for, in case of designation of a volume group for data migration, and designation of volume search criteria of a migration target, specifying logical volumes satisfying the volume search criteria and for migrating data of the volume group to the specified logical volume.

The processes executed by the various programs of the management server 11 are explained next.

FIG. 5 is an initial screen displayed on a display device of the management server 11. In the initial screen are displayed a volume group button, a volume search criteria button, a migration task button, a Create button and an Edit button. The administrator instructs the execution of various processes using an indicating device such as a mouse or the like.

An instance where the administrator creates and edits volume groups will be explained first.

Figure 6:
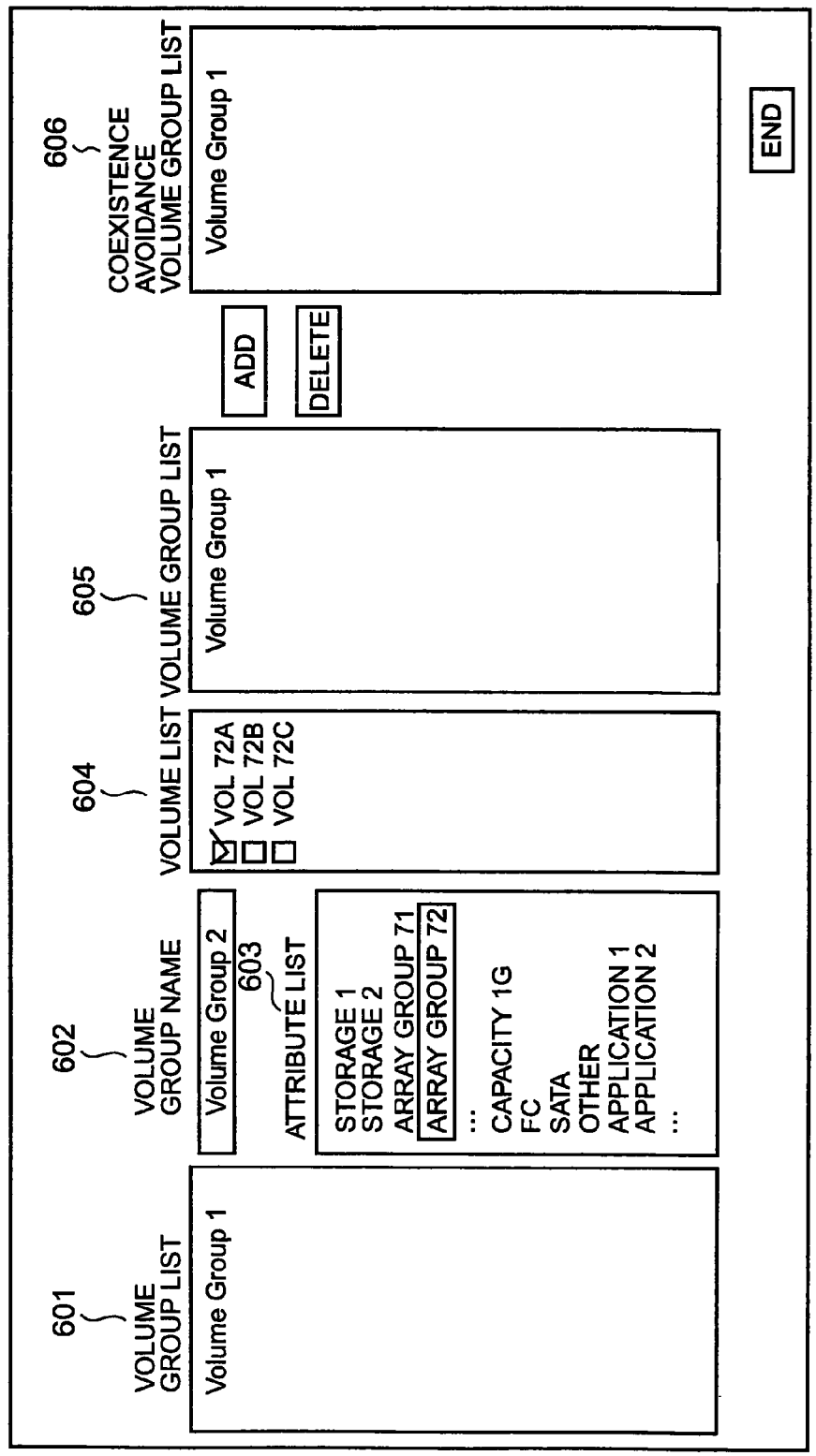
FIG. 6 is a diagram is a diagram illustrating a display example of a screen for volume group setting.

FIG. 6 illustrates an example of a display screen for volume group creation or edition.

In this display screen are displayed a volume group list 601, a volume group name 602, an attribute list 603, a volume list 604, a volume group list 605, a coexistence avoidance volume group list 606, an Add button, a Delete button, and an End button.

In the volume group lists 601 and 605 are displayed volume groups set in the logical volume control table 700 in FIG. 7 explained further below. Although herein are displayed identical volume group lists 601 and 605, one volume group list alone may also be displayed.

The volume group name 602 is an area where the administrator inputs anew a name of a set/updated volume group.

In the attribute list 603 are displayed attributes set in the below-described logical volume control table 700 illustrated in FIG. 7, as well as application names set in the application-volume control table 800 illustrated in FIG. 8. The attributes displayed in the attribute list 603 can be set freely. This can include therefore all or part of the attributes of the logical volume control table 700 illustrated in FIG. 7.

In the volume list 604 are displayed logical volumes having the attributes designated in the attribute list 603, and/or logical volumes of volume groups already set.

In the coexistence avoidance volume group list 606 are displayed volume groups for which array group coincidence is avoided with the volume groups set in the volume group list 601.

The logical volume control table 700 and the application-volume group control table 800 are explained next.

FIG. 7 illustrates an example of a logical volume control table.

In the logical volume control table are set associated VOL, attributes and volume groups for each logical volume (VOL). When the logical volume is a virtual volume, in the list is set the logical volume corresponding to the associated VOL. For instance, volume 75A is a virtual volume, which is indicated by the mapping thereof to volume 81A. The attributes set include storage subsystem, volume number, assignment status, array group, capacity, emulation type, response speed, revolutions, access frequency and disk type corresponding to the media drive. In the assignment status is set "assigned" when an internal volume and/or virtual volume is assigned to the host, "assigned" when an external volume is assigned to a virtual volume, and "unassigned" otherwise.

Information other than the above can also be set as an attribute.

The logical volume control table 700 is generated in the management server 11 from media drive information (disk type, capacity, revolutions and the like) and logical volume information (response speed, access frequency) gathered from the storage subsystem. If the array groups, logical volumes and the like are set, for instance, by another management server, the logical volume control table is generated for instance by another management server, or through gathering of information set in the storage subsystem by another management server or the like.

Figure 8:
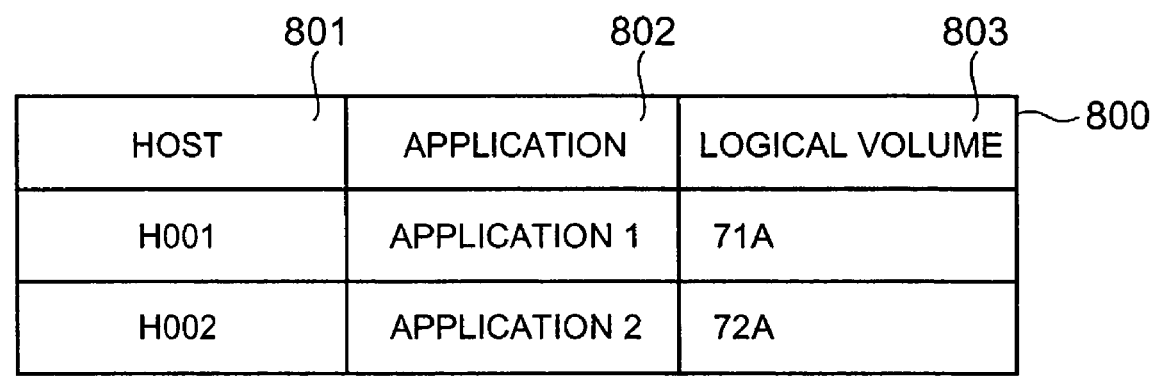

FIG. 8 illustrates an example of an application-volume control table.

Each host manages applications executed by the host as well as the logical volumes used by the applications. The management server 11 gathers from each host mappings between applications and logical volumes and generates the application-volume control table 800. In this table are set hosts 801, applications 802 and logical volumes 803 used by the applications.

Explanation of the display screen of FIG. 6 is resumed herein. The explanation will distinguish a case where the administrator creates anew a volume group and a case where an already set volume group is modified.

Firstly, when the administrator creates anew a volume group, the administrator inputs a volume group to the volume group name 602. Next, the administrator designates attributes displayed in the attribute list 603 in order to select the logical volumes that will make up the volume group. If, for instance, the administrator designates "array group 72", the logical volumes 72A, 72B and 72C mapped to the array group 72 from the logical volume control table 700 of FIG. 7 are displayed. If an application is designated, the logical volumes mapped to the designated application from the application-volume control table 800 illustrated in FIG. 8 are displayed in the volume list. A check box is displayed for each of the displayed logical volumes, such that a check mark is displayed when the administrator indicates the check box. The logical volumes making up a volume group can thus be designated. A displayed check mark can be removed by indicating again the check box. This removes the logical volume set in the volume group. When a coexistence avoidance volume group is designated, a volume group displayed in the volume group list 605 is designated, then the designated volume group is displayed in the coexistence avoidance volume group list by indicating the Add button. FIG. 6 illustrates a volume group (Volume Group 2) being created with volume 72A and Volume Group 1 as a coexistence avoidance volume group.

Edition of an already set volume group is explained next.

The administrator designates a volume group displayed in the volume group list 601. The designated volume group becomes thus displayed in the volume group name 602. The volumes set in the designated volume group are specified from the logical volume control table 700, then the specified logical volumes are displayed in the volume list. When a coexistence avoidance volume group for the designated volume group is set in the below-explained volume group control table, the volume group is displayed in the coexistence avoidance volume group list 606.

If the administrator wishes then to change the name of the volume group, he/she changes the name displayed in the volume group name 602.

The process whereby the administrator modifies the logical volumes constituting a volume group is as follows. Firstly, in case of addition of a logical volume, the administrator designates attributes from among the attribute list 603. As a result, the logical volumes having the designated attributes are displayed in the volume list, below already displayed logical volumes. The administrator can add a logical volume by indicating the check box of the volume to be added, thereby ticking the check box. In case of logical volume deletion, the administrator removes a check mark by indicating the check box of a logical volume displayed in the volume list.

Modification of a coexistence avoidance volume group by the administrator takes place as follows. Firstly, when a coexistence avoidance volume group is to be added, the administrator designates a volume group displayed in the volume group list 605, then the designated volume group is added to the coexistence avoidance volume group list through indication of the Add button. When a coexistence avoidance volume group is to be erased, a volume group displayed in the volume group list 606 is designated, then the relevant volume group is removed from the coexistence avoidance volume group list 606 by indicating the Delete button.

FIG. 9 illustrates an example of a volume group creation process by the volume group management program 13.

In this process are executed "volume group" and "create" selected by the administrator in the display screen illustrated in FIG. 5.

Firstly, the screen illustrated in FIG. 6 is displayed on the display device of the server 11 (S901). Waiting for administrator input follows next (S902); when there is an input, it is judged whether there is an End button indication (S903) If the End button is indicated, the initial screen illustrated in FIG. 5 is displayed (S916) and the process ends.

If there is an attribute designation ("Y" in S904), logical volumes having the designated attributes from the logical volume control table 700 or the application-volume control table 800 are displayed in the volume list 604 (S905), and then input from the administrator is waited for again.

In case of logical volume addition (ticking of a check mark through check box indication) ("Y" in S906), a volume group (the volume group displayed in the volume group name 602) is set for the corresponding logical volume of the logical volume control table 700 (S907), and then input from the administrator is waited for again.

In case of logical volume deletion (unticking of a check mark through check box indication) ("Y" in S908), the volume group set to the corresponding logical volume in the logical volume control table 700 is deleted (S909), and then input from the administrator is waited for again.

If a volume group displayed in the volume group list 605 is designated and the Add button is indicated ("Y" in S910), the designated volume group is displayed in the coexistence avoidance volume group list 606 (S911), the volume group control table is set (S912), then input from the administrator is waited for again.

FIG. 10 illustrates an example of a volume group control table.

In a volume group control table 1000 are set a volume group 1001 and a coexistence avoidance volume group 1002.

FIG. 11 illustrates the setup process of the volume group control table in S912.

Firstly it is judged whether the volume group displayed in the volume group name 602 is set in the volume group 1001 of the volume group control table 1000 (S1101).

If the volume group is set ("Y" in S1101), the volume group added to the coexistence avoidance volume group list 606 is set to the coexistence avoidance volume group 1002 corresponding to the volume group (S1102). If the volume group is not set in the volume group 1001 ("N" in S1101), the volume group displayed in the volume group name 602 is set in the volume group 1001, and the volume group added to the coexistence avoidance volume group list 606 is set in the coexistence avoidance volume group 1002 (S1103).

Next, it is judged whether the volume group added to the coexistence avoidance volume group list 606 is set in the volume group 1001 of the volume group control table (S1104).

If the volume group is set ("Y" in S1104), the volume group displayed in the volume group name 602 is set to the coexistence avoidance volume group 1002 corresponding to the volume group (S1105). If the volume group is not set ("N" in S1104), the volume group added to the coexistence avoidance volume group list 606 is set in the volume group 1001, and the volume group displayed in the volume group name 602 is set in the coexistence avoidance volume group 1002 (S1106).

Explanation of FIG. 9 is resumed herein.

When the name of a volume group displayed in the coexistence avoidance volume group list 606 is designated and the Delete button is indicated ("Y" in S913), the volume group selected from the coexistence avoidance volume group list 606 is erased (S914), the volume group control table is set (S915), and then input from the administrator is waited for again.

Figure 12:
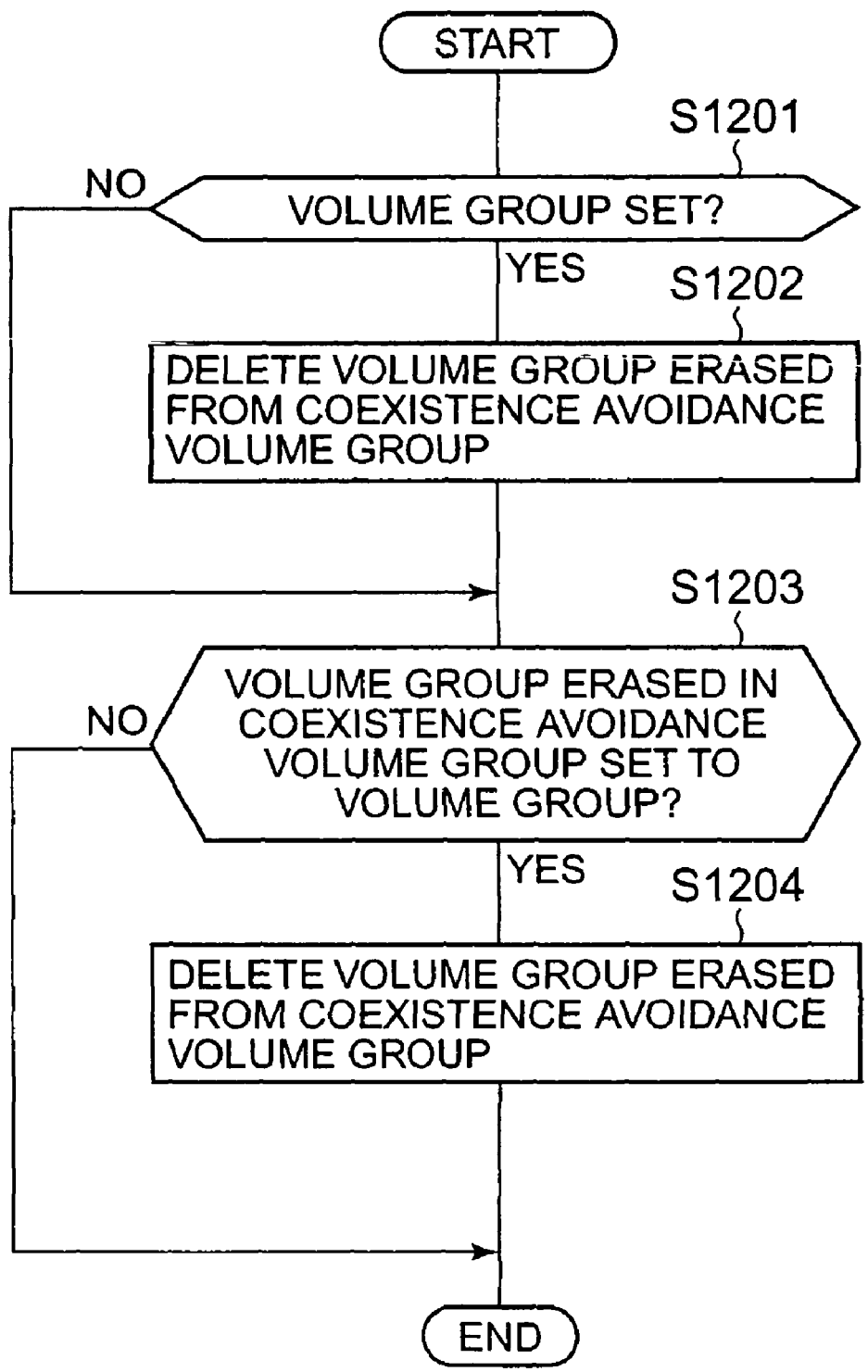
FIG. 12 is a diagram illustrating an example of a process in the volume group management program.

FIG. 12 illustrates the setup process of the volume group control table in S915.

Firstly it is judged whether the volume group displayed in the volume group name 602 is set in the volume group 1001 of the volume group control table (S1201).

If the volume group is set ("Y" in S1201), the volume group erased from the coexistence avoidance volume group list 606 is deleted from the coexistence avoidance volume group 1002 corresponding to the volume (S1202). If the volume group is not set ("N" in S1201), the process moves on to S1203.

Next, it is judged whether the volume group erased from the coexistence avoidance volume group list 606 is set in the volume group 1001 of the volume group control table (S1203).

If the volume group is set ("Y" in S1203), the volume group displayed in the volume group name 602 is deleted from the coexistence avoidance volume group 1002 corresponding to the volume group (S1204).

Figure 13:
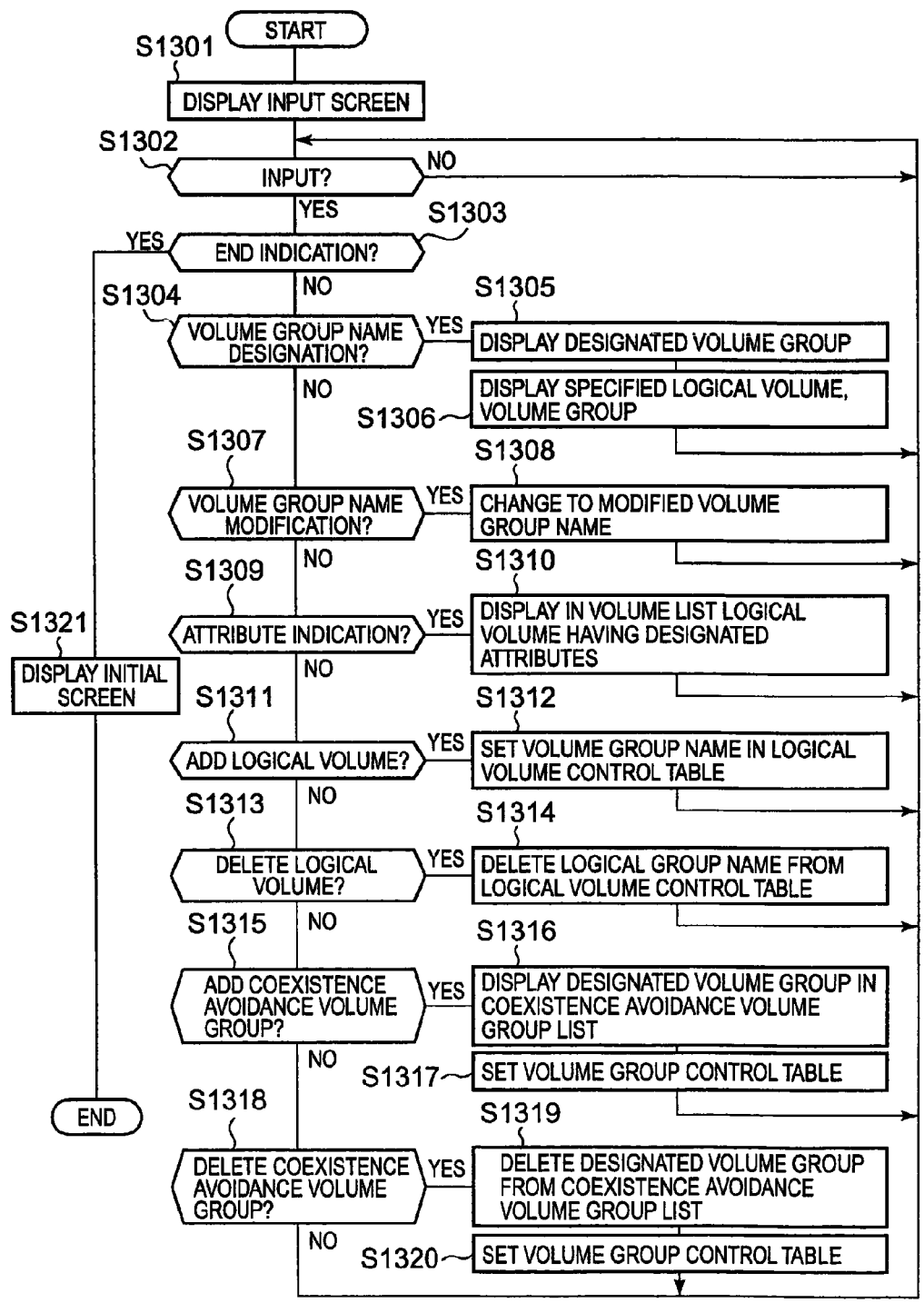
FIG. 13 is a diagram illustrating an example of a process in the volume group management program.

FIG. 13 illustrates an example of a volume group edition process by the volume group management program 13.

In this process are executed "volume group" and "edit" selected by the administrator in the display screen illustrated in FIG. 5.

Firstly, the screen illustrated in FIG. 6 is displayed in the display device of the management server 11 (S1301). At this stage no volume group has been designated yet, and hence nothing is displayed in the volume group name 602, volume list 604 and the coexistence avoidance volume group list 606. Waiting for administrator input follows next (S1302); when there is an input, it is judged whether there is an End button indication (S1303). If the End button is indicated, the initial screen illustrated in FIG. 5 is displayed (S1321) and the process ends.

When a volume group displayed in the volume group list 601 is designated ("Y" in S1304), the designated volume group is displayed in the volume group name 602 (S1305). Taking as a key the designated volume group from the logical volume control table 700 and the volume group control table 1000, logical volumes and a volume group set in the coexistence avoidance volume group 1002 are specified, the specified logical volume and volume group are displayed respectively in the volume list 605 and the coexistence avoidance volume group list 606 (S1306), then input from the administrator is waited for again.

In case of change of volume group name ("Y" in S1307), the volume group designated in the volume group list and set in the logical volume control table 700 and in the volume group control table 1000 is changed to the volume group input in the volume group name 602 (S1308), then input from the administrator is waited for again. In S1307 it is judged whether there is a volume group name 602 input by the administrator and whether the volume group name has changed, by comparing the volume group designated in the volume group list 601 and the volume group input in the volume group name 602. If there is a match, it is judged that no change has occurred, and if there is no match it is judged that a change has occurred.

If there is an attribute designation ("Y" in S1309), logical volumes having a designated attribute from the logical volume control table 700 or the application-volume control table 800 are displayed in the volume list 604 (S1310), and then input from the administrator is waited for again.

In case of volume addition (ticking of a check mark through check box indication) ("Y" in S1311), the volume group input in the volume group name 602 is set to the corresponding logical volumes of the logical volume control table 700 (S1312), and then input from the administrator is waited for again.

In case of volume deletion (unticking of a check mark through check box indication) ("Y" in S1313), the volume group set to the corresponding logical volumes from the logical volume control table 700 is deleted (S1314), and then input from the administrator is waited for again.

If a volume group displayed in the volume group list 605 is designated and the add button is indicated ("Y" in S1315), the designated volume group is displayed in the coexistence avoidance volume group list (S1316) and the volume group control table is set (S1317), then input from the administrator is waited for again. The process for setting the volume control table in S1317 is identical to that illustrated in FIG. 11.

When a volume group displayed in the coexistence avoidance volume group list 606 is designated and the Delete button is indicated ("Y" in S1318), the volume group designated is erased from the coexistence avoidance volume group list 606 (S1319), the volume group control table is set (S1320), and then input from the administrator is waited for again. The process for setting the volume control table in S1320 is identical to that illustrated in FIG. 12.

Volume search criteria creation and edition by the administrator are explained next.

Figure 14:
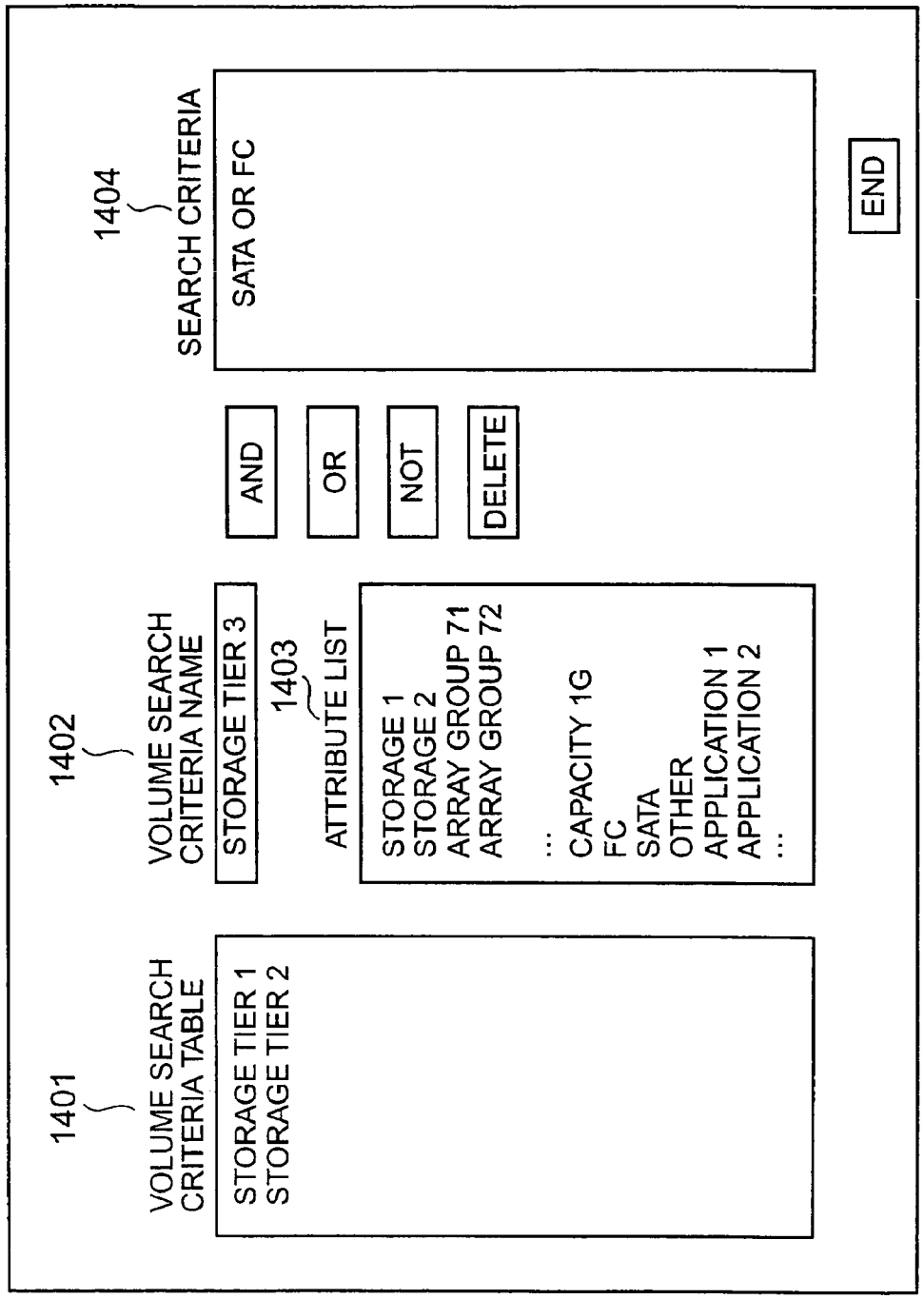
FIG. 14 is a diagram illustrating a display example of a screen for setting volume search criteria.

FIG. 14 illustrates and example of a display screen for volume search criteria creation and edition. In the display device of the management server 11 are displayed a volume search criteria list 1401, a volume search criteria name 1402, an attribute list 1403, search criteria 1404, logical condition buttons (AND button, OR button, NOR button), a Delete button and an End button.

In the volume search criteria list 1401 are displayed the below-described volume search criteria set in FIG. 15. In the volume search criteria name 1402 is displayed the name of the search criteria input by the administrator, or the name of search criteria already set. In the attribute list 1403 are displayed attributes of the logical volume control table. In the search criteria 1404 are displayed attributes and logical conditions designated from the attribute list 1403 and from the logical condition buttons.

FIG. 15 illustrates an example of a volume search criteria control table.

In the volume search criteria control table 1500 are set volume search criteria 1501 and search criteria 1502. In the volume search criteria 1501 are set the volume search criteria name 1402 input by the administrator in the screen of FIG. 14, while in search criteria 1502 are set the attributes and logical conditions input by the administrator.

Figure 16:
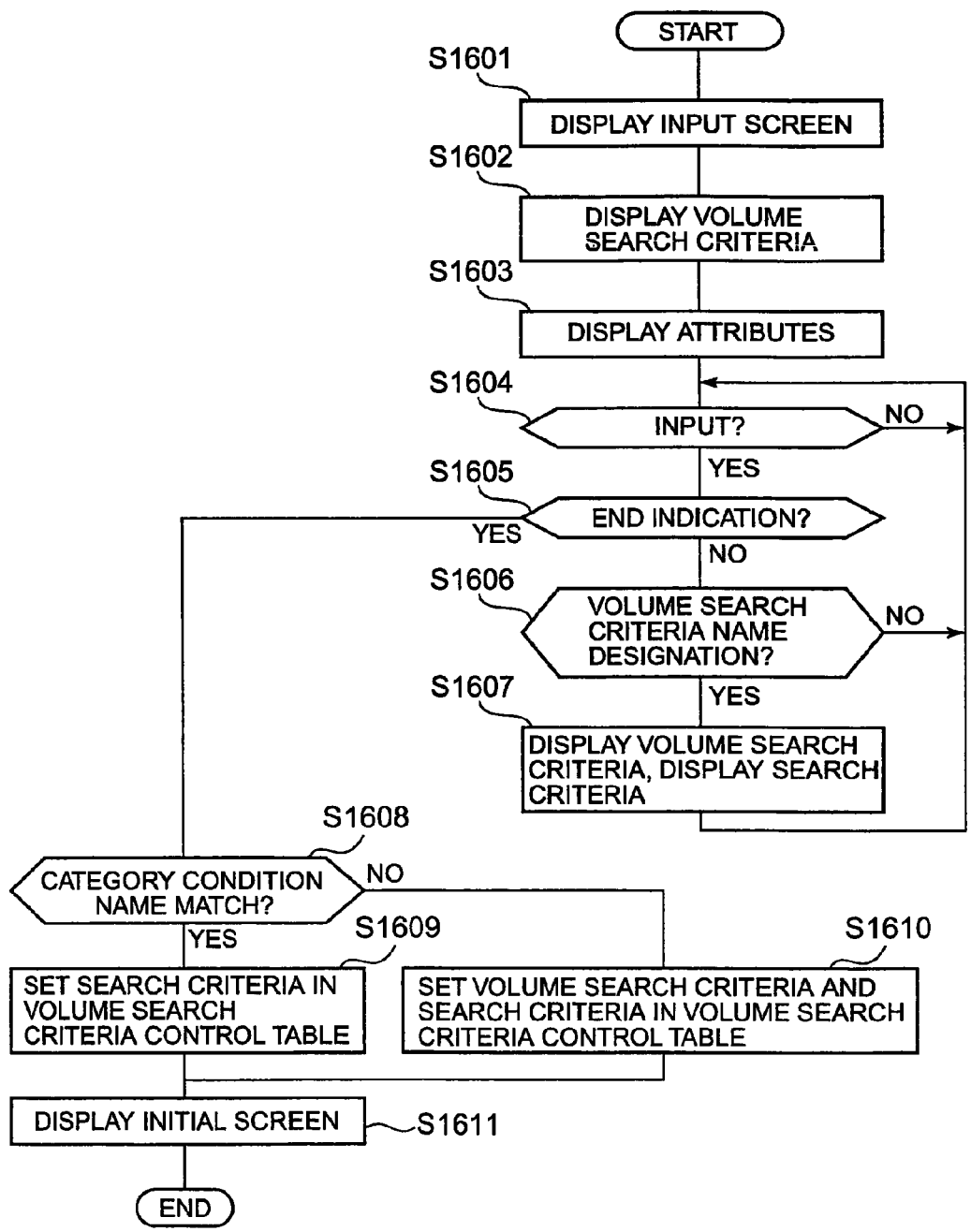
FIG. 16 is a diagram illustrating an example of a process in a volume search criteria management program.

FIG. 16 illustrates a process example of volume search criteria creation or edition.

In this process are executed "volume search criteria" and "create" or "edit" selected by the administrator in the display screen illustrated in FIG. 5.

Firstly, the screen illustrated in FIG. 14 is displayed in the display device of the management server 11 (S1601). The volume search criteria control table 1500 is searched next, and if volume search criteria are set, the volume search criteria are displayed in the search criteria list 1401 (S1602). The attributes set in the logical volume control table 700 are displayed in the attribute list 1403 (S1603). Waiting for administrator input follows next (S1604); when there is an input, it is judged whether there is an End button indication (S1605).

If the input by the administrator designates the volume search criteria displayed in the volume search criteria list 1401 ("Y" in S1606), the designated volume search criteria are displayed in the volume search criteria name 1402, then the search criteria corresponding to the designated volume search criteria are read from the volume search criteria control table 1500 and are displayed in these arch criteria 1404 (S1607)

When in S1605 the input by the administrator is an indication of the End button ("Y" in S16O5), it is judged whether the volume search criteria matching the name input in the volume search criteria name 1402 are in the volume search criteria control table 1500 (S1608); if there are matching volume search criteria ("Y" in S1608), the search criteria set in the search criteria 1604 are set in the volume search criteria control table 1500 (S1609).If there is no matching name ("N" in S1608), the input volume search criteria and the input search criteria are set in the volume search criteria control table (S1609). Then the initial screen illustrated in FIG. 5 is displayed (S1610), and the process ends.

Figure 17:
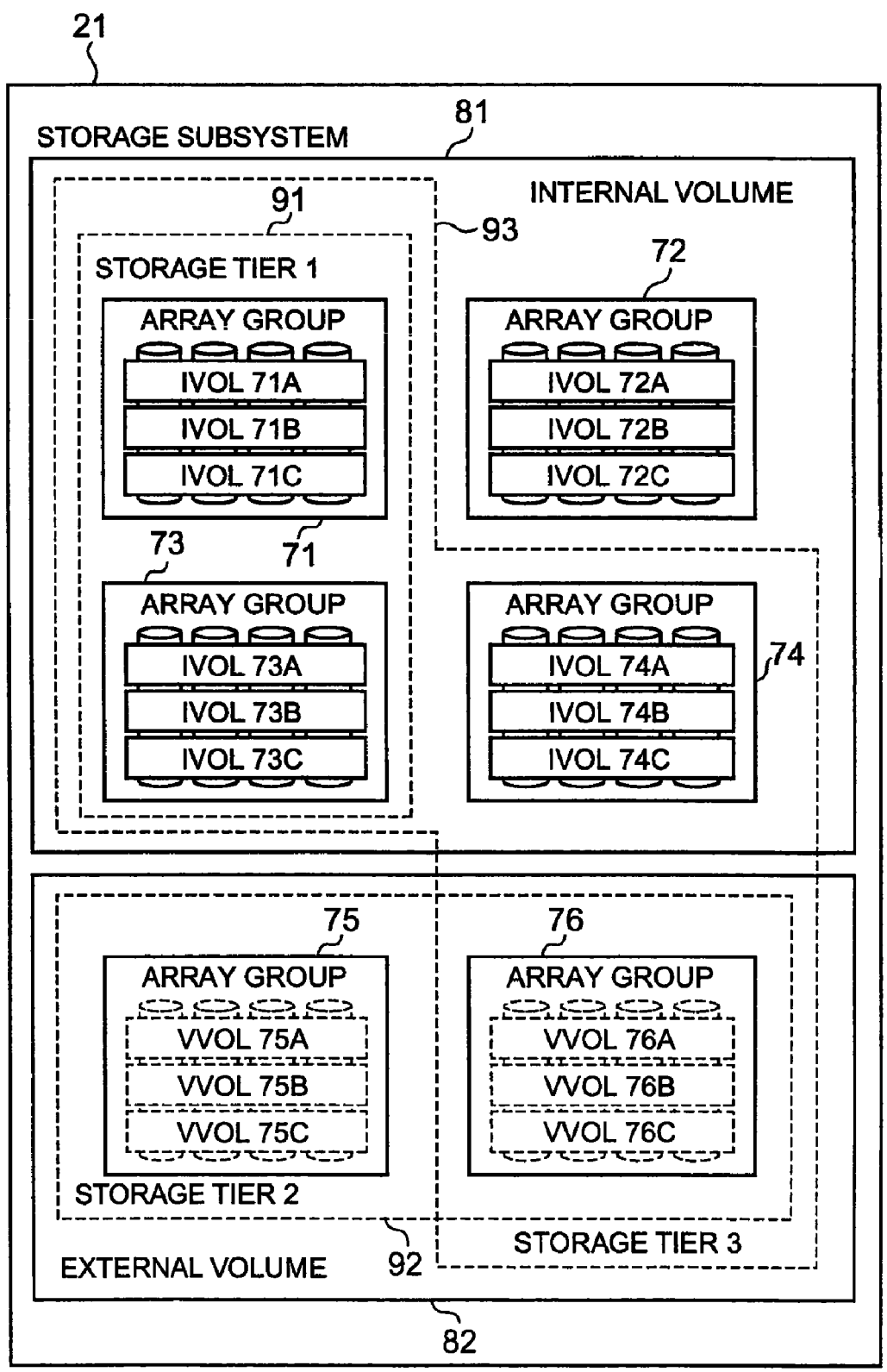
FIG. 17 is a diagram illustrating logical volume classification in accordance with volume search criteria.

FIG. 17 illustrates an example of logical volumes selected by volume search criteria management. FIG. 17 illustrates the logical volumes of the storage subsystems 21 and 121. The virtual volumes are shown mapped to the mapped logical volumes. The broken lines denote logical volumes that satisfy the volume search criteria illustrated in FIG. 15 based on the attributes of the logical volumes in the logical volume control table 700 illustrated in FIG. 7. The logical volumes of the storage subsystem can thus be classified in accordance with the volume search criteria. Thus, groups of high-performance logical volumes and groups of low-performance logical volumes can be defined in accordance with the volume search criteria, to enable managing the logical volumes as a logically tiered structure. When the logical volumes of plural storage subsystems are classified using these volume search criteria, one volume group can be formed across the storage subsystems.

A migration task for migrating data in accordance with the set volume groups and volume search criteria is explained next.

Figure 18:
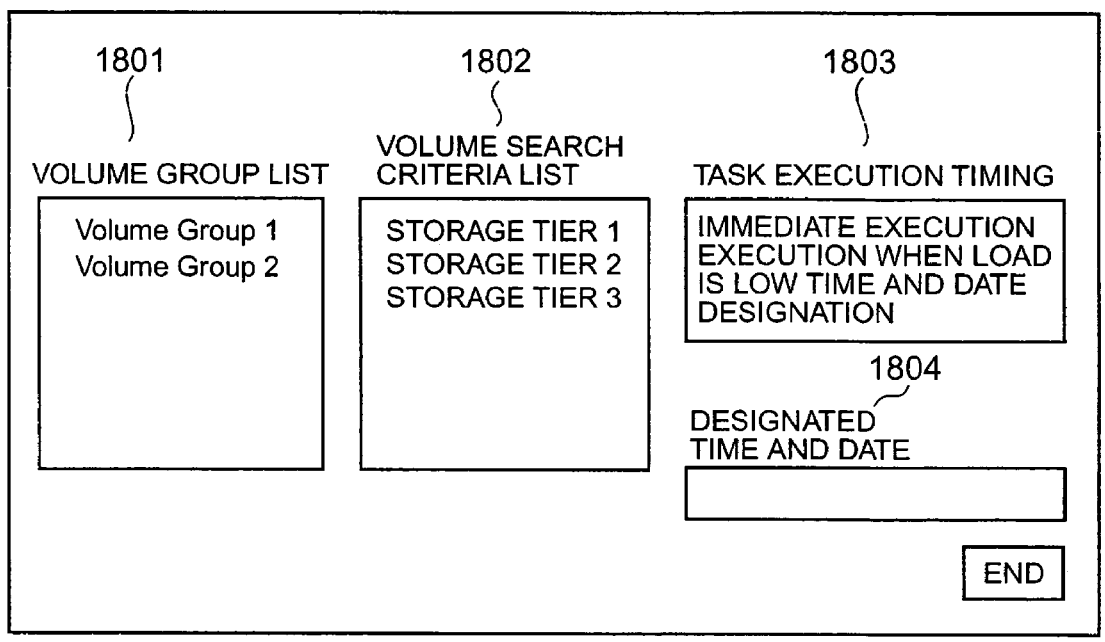
FIG. 18 is a diagram illustrating a display example of a screen for migration task setting.

FIG. 18 illustrates an example of a settings screen for executing a migration task.

In the display device of the management server 11 are displayed a volume group list 1801, a volume search criteria list 1802, a task execution timing 1803, and an End button.

In the volume group list 1801 are displayed the names of volume groups set in the logical volume control table 700. In the volume search criteria list 1802 are displayed volume search criteria set in the volume search criteria control table 1500. The administrator designates a volume group displayed in the volume group list 1801, designates search criteria displayed in the volume search criteria list 1802, designates a task execution timing 1803, and indicates the End button. As a result, the data migration task is set up in a task control table.

FIG. 19 illustrates an example of a task control table for data migration.

In a task control table 1900 are set a migration task 1901 and a volume group 1902, volume search criteria 1903, a task execution timing 1904, a source volume 1905 and a target volume 1906 designated by the administrator. In the source volume 1905 are set the logical volumes being the migration source and in the target volume 1906 are set the logical volumes being the migration target. The logical volumes being the migration source are logical volumes set in the volume group, while the logical volumes being the migration target are the logical volumes satisfying the volume search criteria, as explained below.

Figure 20:
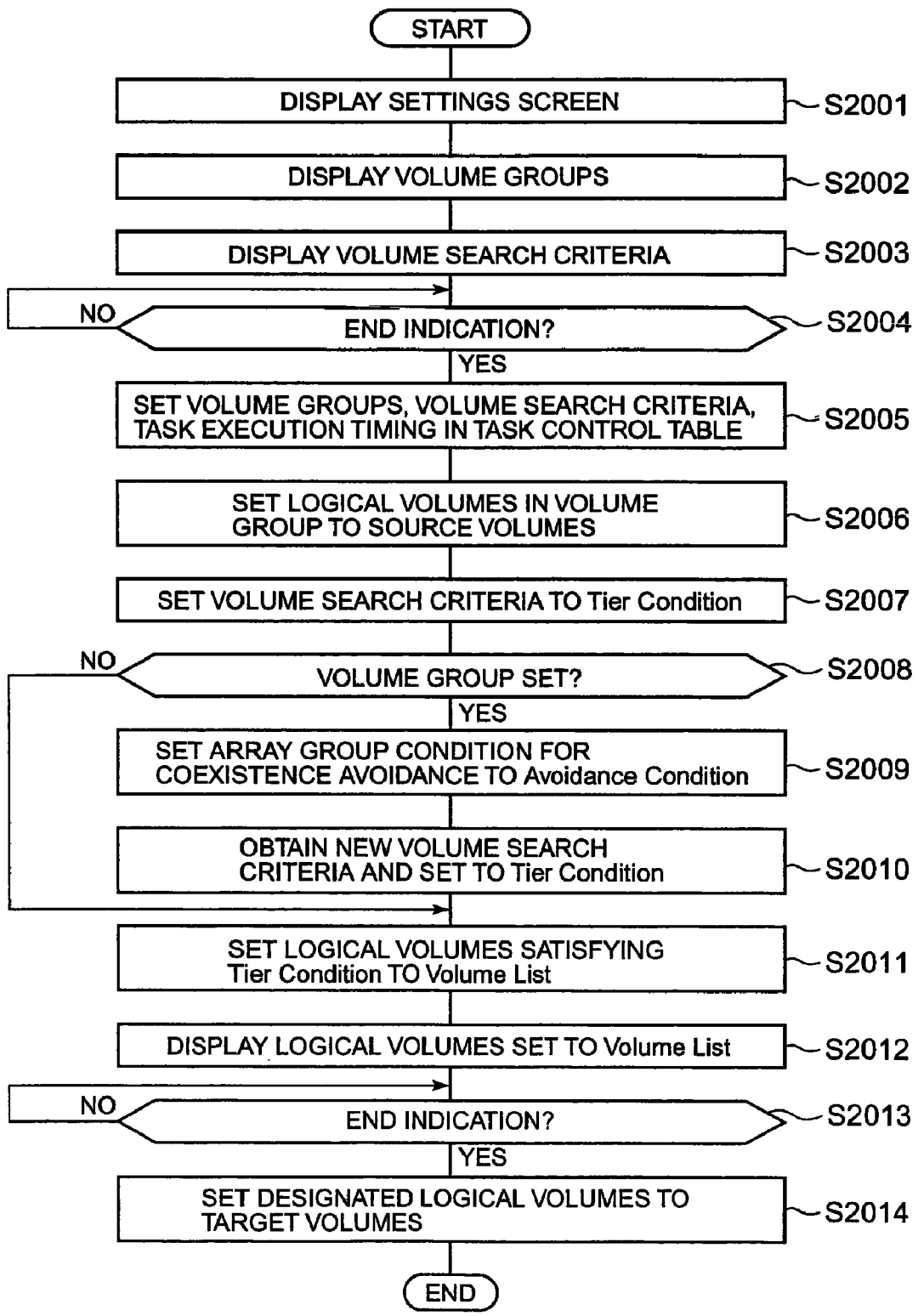
FIG. 20 is a diagram illustrating an example of a process in a migration task management program.

FIG. 20 illustrates the process by the migration task management program 15.

In this process are executed "migration task" and "create" selected by the administrator in the display screen illustrated in FIG. 5. In the explanation of this process, Tier Condition, Avoidance Condition, and Volume List are process variables used by the CPU of the management server 11, the data that are set to the variables being stored in a storage area of the CPU.

Firstly, the screen illustrated in FIG. 18 is displayed in the display device of the management server 11 (S2001). The volume groups set in the logical volume control table 700 are read and displayed in the volume group list 1801 (S2002). Volume search criteria are read next from the volume search criteria control table 1500, and are displayed in the volume search criteria list 1802 (S2003). The process then waits for an End button indication by the administrator (S2004). When the administrator indicates the End button ("Y" in S2004), the designated volume group, volume search criteria and task execution timing are set in the task control table 1900 (S2005). Next, the logical volumes for which the designated volume group is set are specified from the logical volume control table 700, and are set as the source volume 1905 of the task control table 1900 (S2006).

The designated volume search criteria are read next from the volume search criteria control table 1500, and are set as the Tier Condition (S2007).

Figure 21:
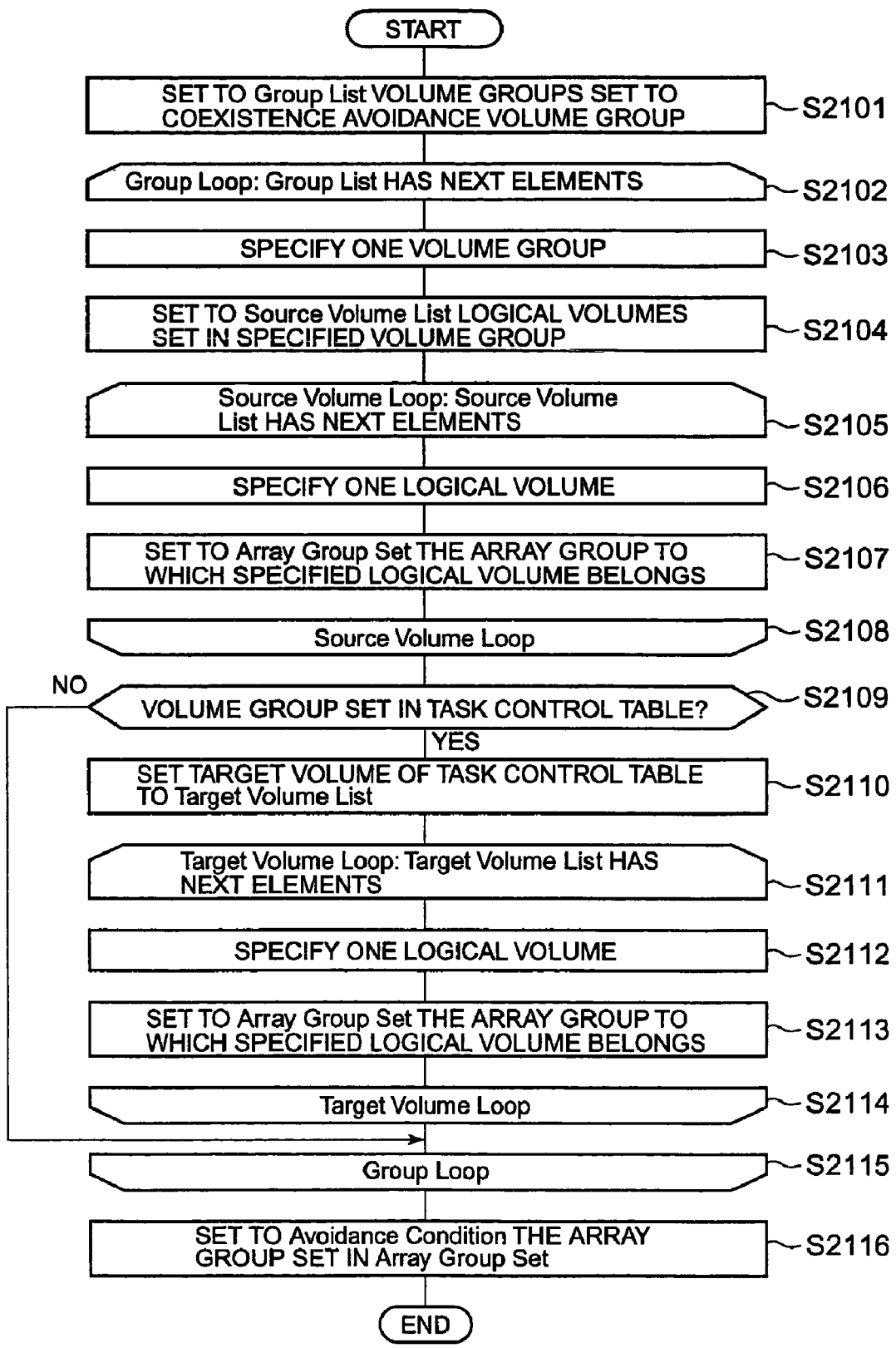
FIG. 21 is a diagram illustrating an example of a process in the migration task management program.

Next it is judged whether the designated volume group is set in the volume group control table 1000 (S2008). If so ("Y" in S2008), a coexistence avoidance volume group is accordingly set, and hence the array group condition for avoiding coincidence is set as Avoidance Condition (S2009) FIG. 21 illustrates the process in S2009.

Next, new search criteria are obtained from the search criteria set to the Tier Condition in S2007 and from the array group condition for avoiding coincidence set to Avoidance Condition in S2009, and are set as Tier Condition (S2010). For instance, if the search criteria set in S2007 is FC and the array group condition for coexistence avoidance obtained in S2009 is Array Group 71, the new search becomes "FC" NOT IN "Array Group 71", which is set as the Tier Condition. That is, the search is for an FC disk type not belonging to array group 71.

Next, the logical volumes satisfying the newly set search criteria (search criteria set as Tier Condition) are specified from the logical volume control table 700, and the specified logical volumes are set as Volume List (S2011). The specified logical volumes herein are logical volumes having "unassigned" assignment status, a capacity equal to or higher than that of the logical volumes of the migration source, and satisfying the newly set search criteria.

The logical volume list set to Volume List is displayed in the display device of the management server 11 (S2012).

Figure 22:
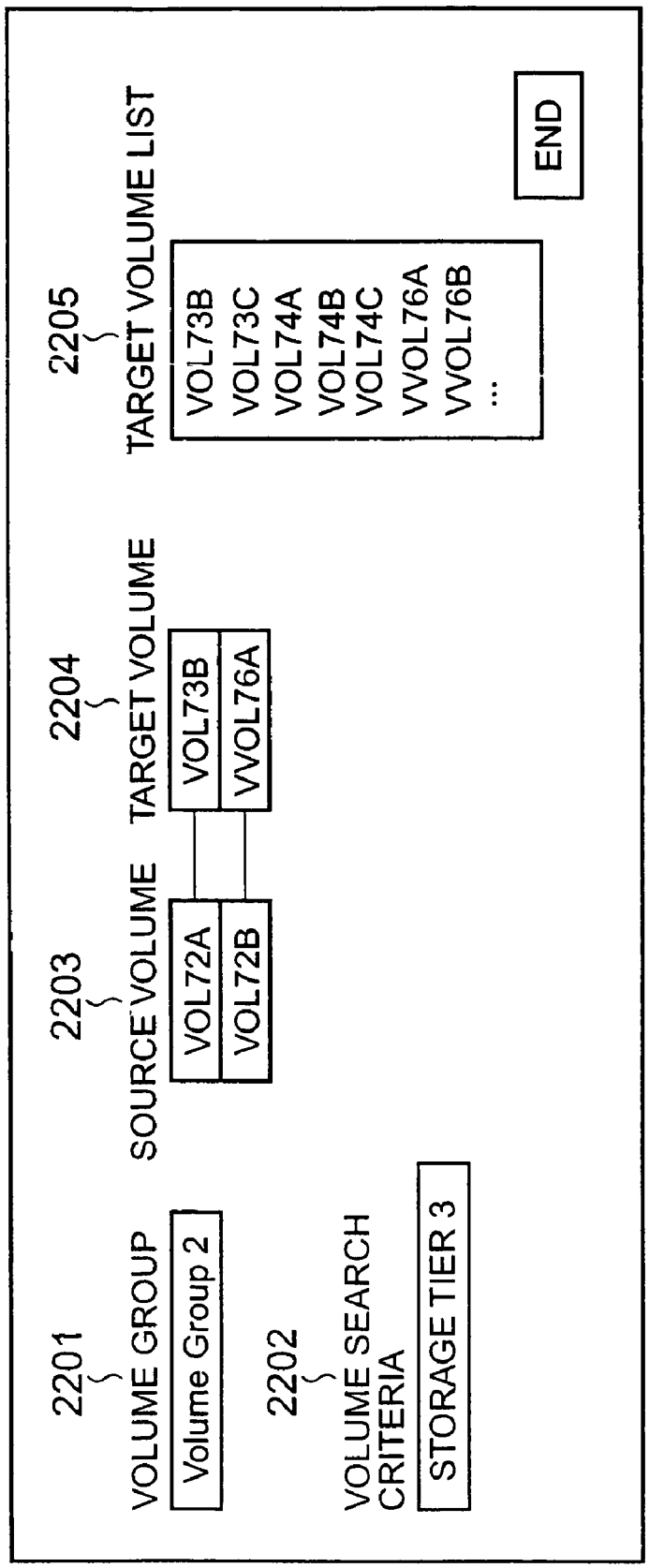
FIG. 22 is a diagram illustrating an example of search result display.

FIG. 22 illustrates an example of a display screen of logical volumes specified in accordance with volume search criteria in the process of S2011. In the display screen are displayed a volume group 2201, a volume search criteria 2202, a source volume 2203, a target volume 2204, a target volume list 2205, and an End button. The volume group 2201 and the volume search criteria 2202 display the designated volume group and volume search criteria. In the source volume 2203 are displayed logical volumes belonging to the designated volume group. In the target volume list 2205 are displayed logical volumes set to Volume List. When no logical volume satisfies the volume search criteria in S2011 nothing is displayed in the target volume list 2205. In the target volume 2204 are displayed volumes selected by the administrator from the logical volumes displayed in the target volume list 2205. After setting the target volumes the administrator indicates the End button.

We resume now the explanation of FIG. 20.

When after a wait for an End button indication the End button is indicated (S2013), the designated logical volumes are set to the target volumes of the task control table (S2014), and the process ends.

In the instance explained the administrator selects the target volumes, but logical volumes specified as satisfying the volume search criteria in S2011 may also be sequentially mapped to the source volumes.

FIG. 21 illustrates the process for obtaining array group conditions for coexistence avoidance. In the explanation of this process, Group List, Source Volume List, Target Volume List and Array Group Set are process variables used by the CPU of the management server 11, the data that are set to the variables being stored in a storage area of the CPU.

Firstly, with reference to the volume group control table 1000, the volume groups set to the coexistence avoidance volume groups corresponding to the designated volume groups are read, and are set to Group List (S2101). Next, the processes of steps S2102 to S2115 are performed for all the volume groups set to Group List.

Firstly, one volume group is specified (S2103), then all the logical volumes set to that volume group are specified and are set to Source Volume List (S2104). Next, one of the logical volumes set in S2104 is specified (S2106), then the array group to which that logical volume belongs is specified from the logical volume control table 700, then the specified array group is set to Array Group Set (S2107). The steps S2105 to S2108 are executed for all the logical volumes set to Source Volume List.

Next it is judged whether the migration task of the volume groups specified in S2103 is unprocessed (S2109); if unprocessed, S2110 to S2114 are processed. This process is performed for discarding migration target array groups when migration is planned to volume groups set in the coexistence avoidance volume group. For judging whether the migration task is unprocessed or not it is judged whether corresponding volume groups are set or not in the task control table 1900. If these volume groups are set, the migration task is judged to be unprocessed.

Firstly, logical volumes set to target volumes from the task control table 1900 are set to Target Volume List (S2110). Next, one logical volume set to Target Volume List is specified (S2112), then the array group to which that logical volume belongs is specified from the logical volume control table 700, then the specified array group is set as Array Group Set (S2113). Steps S2111 to S2114 are executed for all the target volumes, then the array groups for all the logical volumes set to Target Volume List are added to the Array Group Set.

If there is no unprocessed task in S2109, S2110 to S2114 are not processed.

The array groups set to Array Group Set are thus set to Avoidance Condition as the array group condition for coexistence avoidance (S2316).

Figure 23:
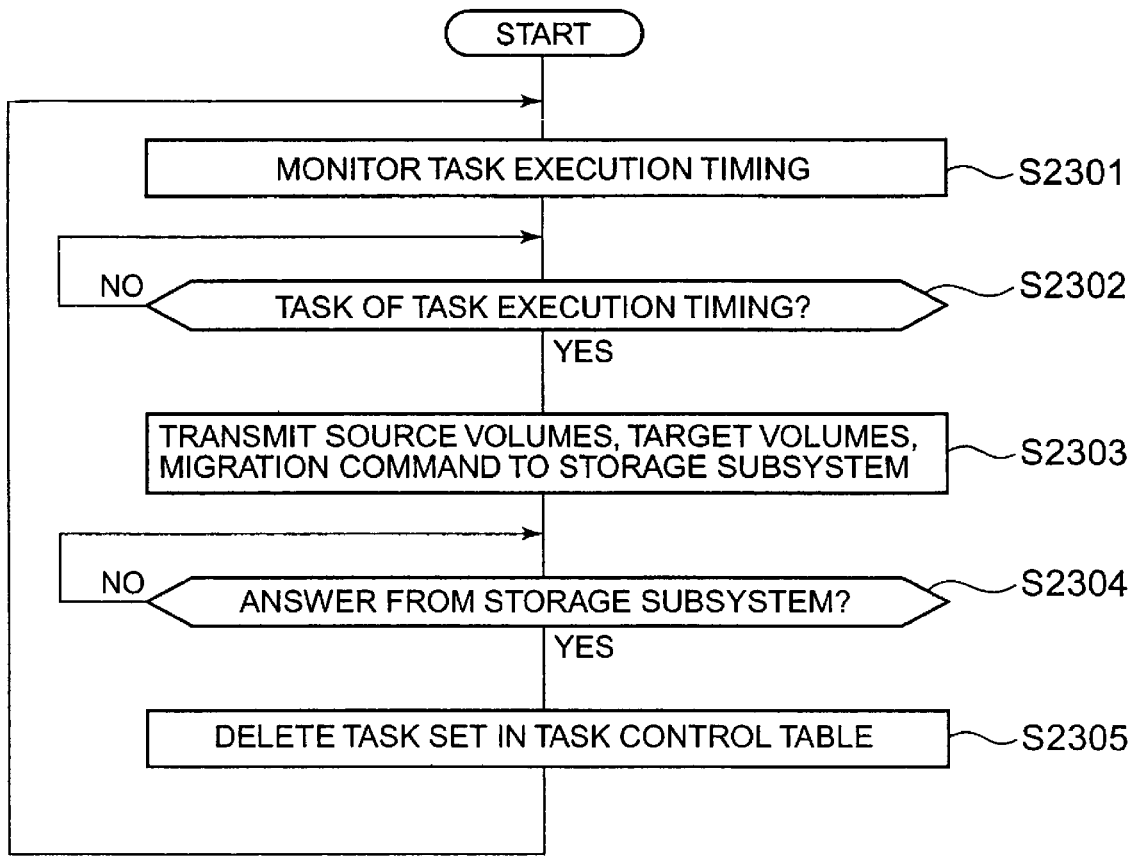
FIG. 23 is a diagram illustrating an example of a process in the migration task management program.

FIG. 23 illustrates the execution process of the task set in the task control table 1900. Once a task is set in the task control table the process in accordance with FIG. 20 starts.

Firstly, the execution timing of the task set in the task control table is monitored (S2301), then if there is a task for this execution timing (S2302), the source volumes, the target volumes and a migration command are transmitted to the storage subsystem (S2303). When a migration end is received from the storage subsystem ("Y" in S2304), the tasks set in the task control table are deleted (S2305) and the process ends.

The example below illustrates the data migration process explained heretofore.

Figure 24:
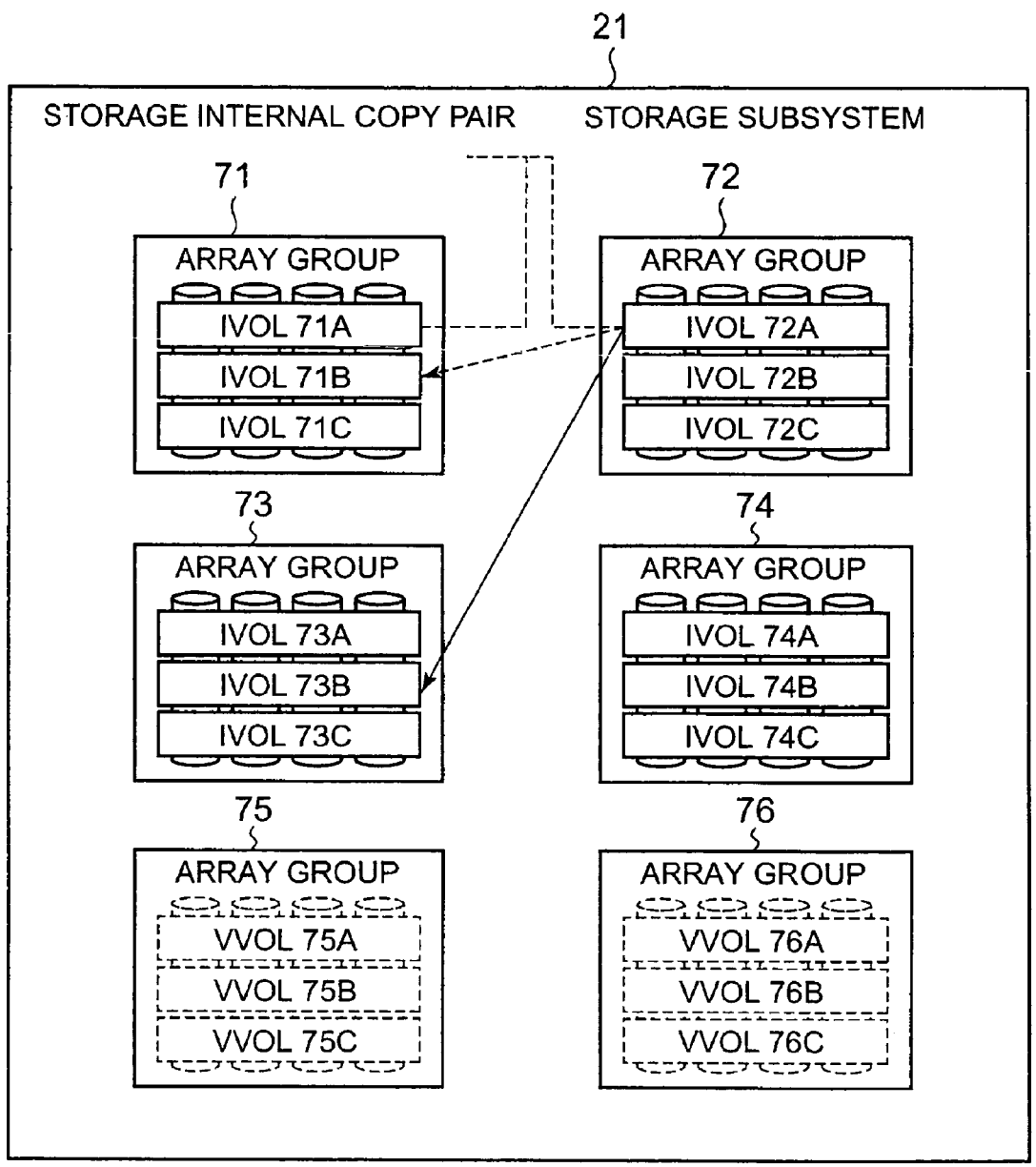
FIG. 24 is a diagram for explaining data migration.

FIG. 24 shows an example of migration of volume 72A, which together with volume 71A forms a copy pair in one storage subsystem.

Firstly, a Volume Group 1 including the volume 71A is created in the process of FIG. 9. At this stage, no volume group is created for the volume 72A, and hence no coexistence avoidance volume group can be set for the Volume Group 1.

Next, a Volume Group 2 including the volume 72A is set in accordance with the process of FIG. 9. Since the Volume Group 1 having the volume 71A is already created, the Volume Group 1 is set as the coexistence avoidance volume group.

The volume search criteria illustrated in FIG. 15 are created in the process of FIG. 16.

The migration task for migrating the Volume Group 2 under the condition "storage tier 1" is created in the process of FIG. 20.

As a result, (array group NOT IN (71)) is set as Avoidance Condition in the step S2009 illustrated in FIG. 20. In S2010 of FIG. 20 ((disk type=FC) AND (array group NOT IN (71))) is set as the Tier Condition. As a result, volume 73B and 73C are set in Volume List in S2011 of FIG. 20. Since the volume 73A is already assigned in the logical volume control table 700, it is not set in the Volume List.

The administrator designates volume 73B or 73C as the migration target of volume 72A.

Upon migration, thus, the data of the volume 72A can be placed in an array group different from that of volume 71A.

Herein it is the administrator that designates the migration target of a logical volume, but volume 73B or 73C set to Volume List may also be selected automatically.

Figure 25:
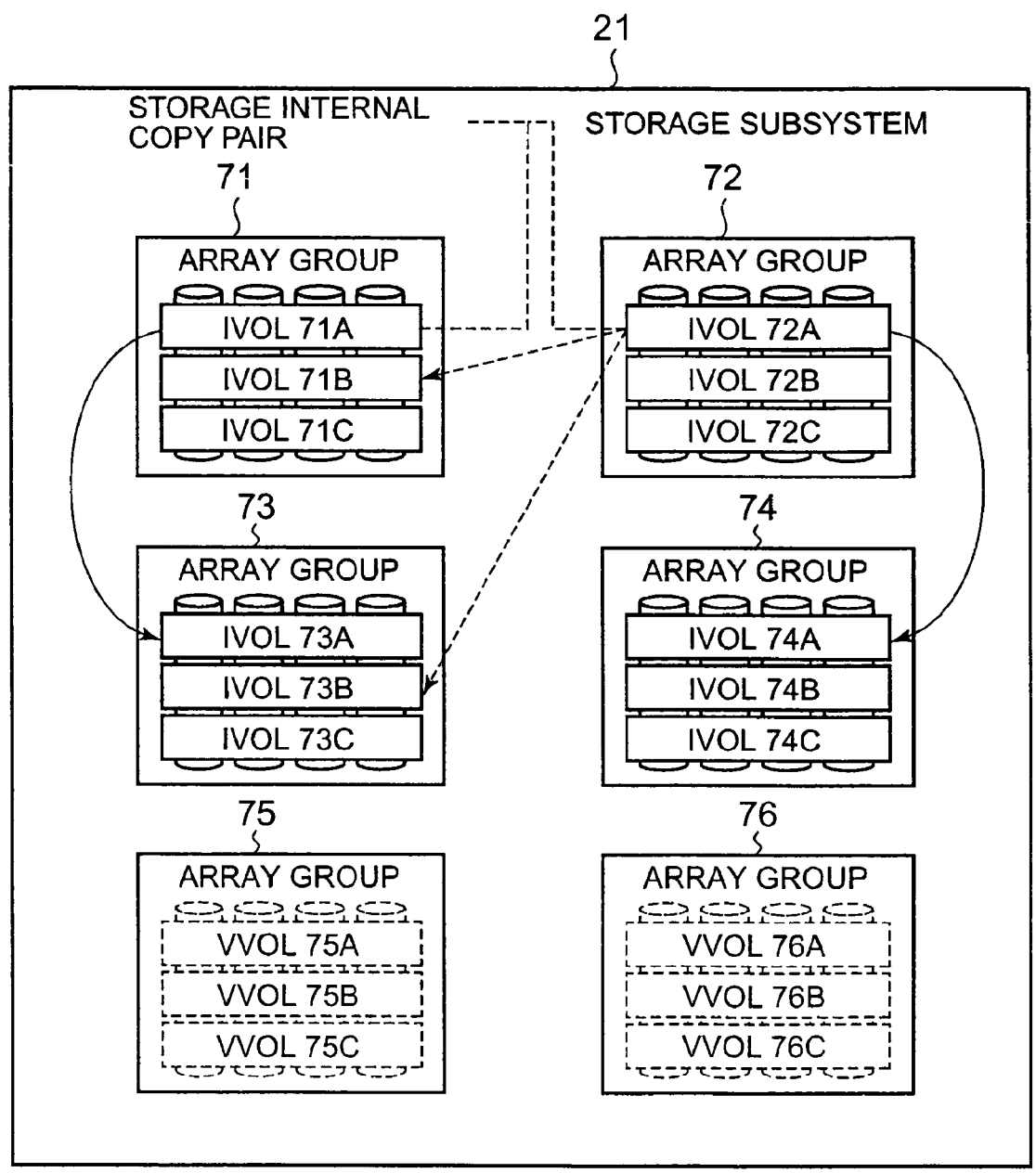
FIG. 25 is a diagram for explaining data migration.

FIG. 25 illustrates an example of migration of volume 72A, which together with volume 71A forms a copy pair in one storage subsystem.

Volume 71A is set as the logical volume of Volume Group 1 while no migration group is set as the coexistence avoidance volume group. In Volume Group 1 is set the migration task for migration to volume 73A of the array group 73.

Volume 72A is set as the logical volume of Volume Group 2, and Volume Group 1 is set as the coexistence avoidance volume group.

Creation of a migration task for migration of Volume Group 2 to a storage tier 3 is explained next.

In this case, (array group NOT IN (71 and 73)) is set as Avoidance Condition in S2009 of FIG. 20. Accordingly, (((disk type=SATA) OR (disk type=FC)) AND (array group NOT IN (71 and 73))) is set as Tier Condition in S2011 of FIG. 20. As a result, volumes 74A, 74B and 74C of the array group 74 are set to Volume List as the logical volumes of the migration target, then the administrator selects the migration target logical volume.

The data of volume 72A becomes then placed in an array group different from those of volume 71A and volume 73A.

Figure 26:
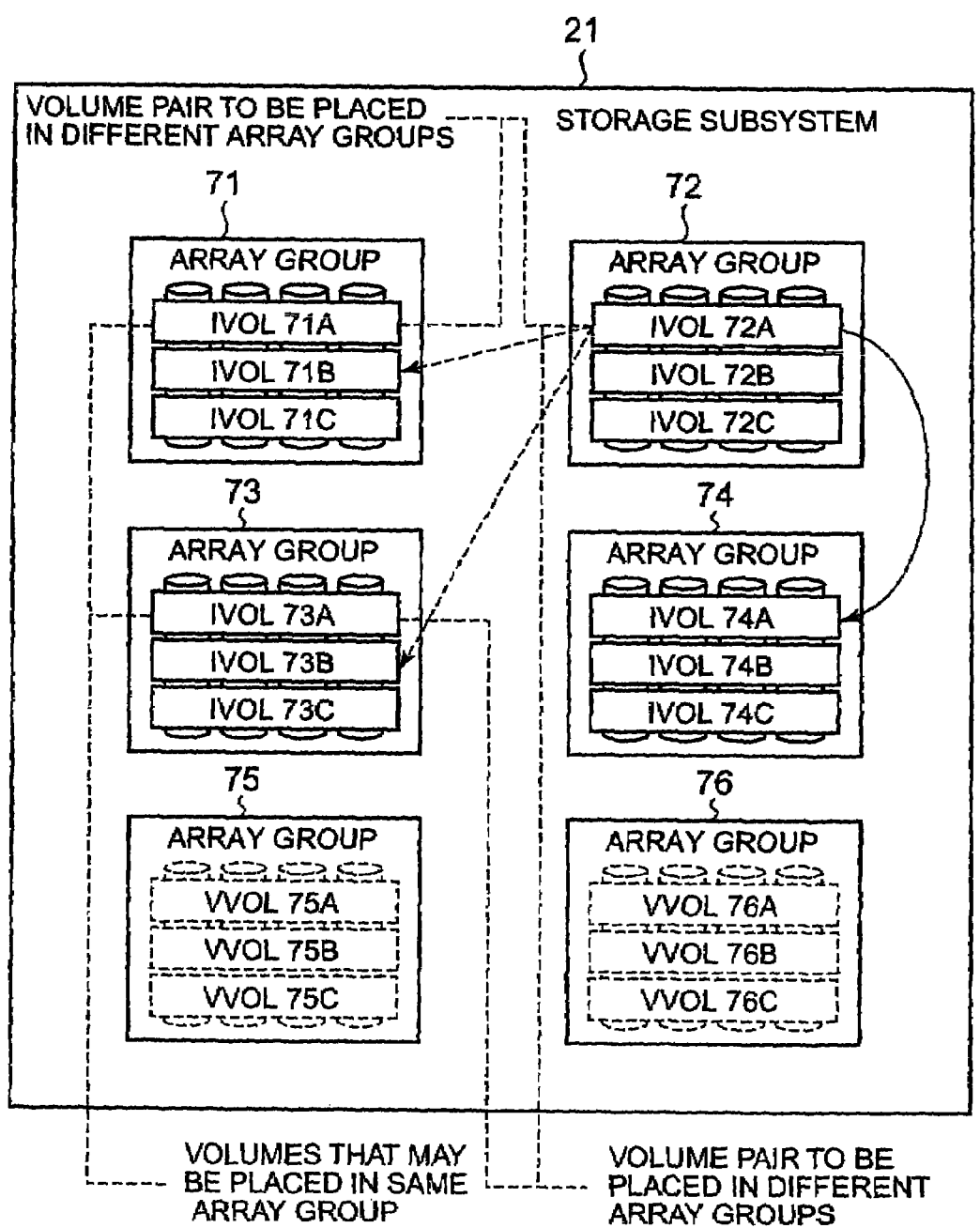
FIG. 26 is a diagram for explaining data migration.

FIG. 26 illustrates a case where a database table file is stored in volume 71A and volume 73A, while a log-file of the database is stored in volume 72A. Herein will be explained an instance of volume 72A migration in which the migration target is placed in an array group different from those of volume 71A and volume 73A.

Firstly, a Volume Group 1 is created with volume 71A and volume 73A as the logical volumes, in accordance with the process of FIG. 9.

Next, a Volume Group 2 is created with volume 72A as the logical volume and Volume Group 1 as the coexistence avoidance volume group, in accordance with the process of FIG. 9.

Next, when the process of FIG. 20 is executed through designation of Volume Group 2 and the storage tier 3, the array group 71 and the array group 73 are set in S2009 as Avoidance Condition, and (((disk type=SATA) OR (disk type=FC)) AND (array group NOT IN (71 and 73))) is set as Tier Condition in S2010. As a result, volumes 74A, 74B and 74C of the array group 74 and volumes 76A, 76B and 76C of the array group 76 are set to Volume List.

The explanation heretofore has involved migration to a different array group based on volume group units.

In the operation of storage subsystems, however, sometimes a copy pair is created at an initial stage between logical volumes belonging to a same array group. In such cases, if a media drive of the array group fails, data from any of the logical volumes may become unreadable, as has been explained. It has also been explained that, in case of high access frequency for plural logical volumes belonging to one array group, array group performance can be enhanced through distribution to other array groups.

Next is explained a configuration for finding a logical volume having an associated logical volume located on the same array group, and for distributing and placing the logical volume.

FIG. 27 illustrates an example of a copy control table. In a copy control table 2700 are set a category 2701, a main volume 2702 and a secondary volume 2703. In case of copy as the category there are set a main volume and a secondary volume in which are stored duplicated data of the main volume. The relationship of the main volume and the secondary volume may be synchronous or asynchronous. Also, plural secondary volumes may be set for one main volume. In case of snapshot, a secondary volume is set for a main volume. A secondary volume is a duplicate (snapshot) of data of the main volume at a point in time. Plural logical volumes are set as the secondary volume in case of acquiring snapshots at plural points in time.

In addition to this, other categories such as differential backup for holding duplicated differential data may also be set.

This copy control table is set in the storage subsystem and the management server 11.

Figure 28:
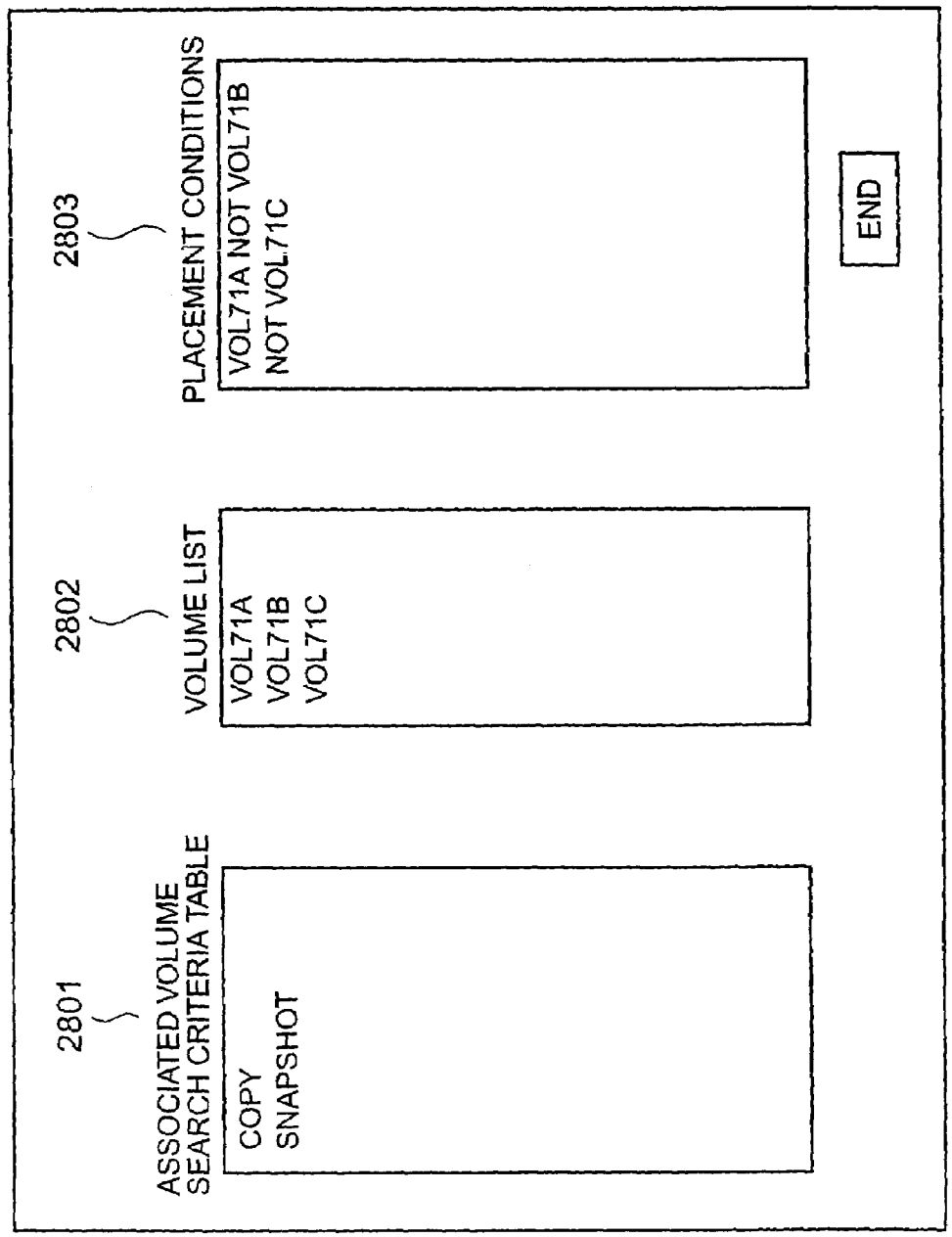
FIG. 28 is a diagram illustrating an example of a settings screen for distribution/placement of data.

FIG. 28 illustrates an example of a settings screen for distribution/placement of logical volumes.

In this settings screen are displayed an associated volume search criteria list 2801, a volume list 2802 and placement conditions 2803.

In the associated volume search criteria list 2801 are displayed, for instance, the categories, access frequencies or the like of the copy control table illustrated in FIG. 27. In the volume list 2802 are displayed logical volumes placed in a same array group and satisfying the search criteria designated by the associated volume search criteria. If, for instance, copy is selected, the main volume of the copy control table and the logical volumes of the secondary volume are specified, and it is judged, on the basis of the logical volume control table 700, whether the specified volumes are set in a same array group; if so, the specified volumes are displayed in the volume list 2802. When access frequency is designated, an access frequency lower limit is set beforehand whereby logical volumes with an access frequency equal to or higher than such lower limit and belonging to a same array group are specified from a logical volume control table and are displayed in the volume list 2802. The CPU 16 of the management server 11 carries out processing of the specification of the logical volumes conforming to the conditions designated in the associated volume search criteria, and carries out display processing of the logical volumes in the volume list 2802. In case of separate re-location in array groups of logical volumes displayed in the volume list 2802, the administrator sets the conditions in the placement conditions 2803. For a snapshot of main volume 71A, and secondary volumes 71B and 71C in case of a 71A NOT 71B NOT 71C setting, for instance, this means setting volumes 71A and 71B, and 71B and 71 C to different array groups (in this case 71A and 71C may share the same array group). For a (71A NOT 71B) NOT 71C setting, this means setting volumes 71A, 71B and 71C to different array groups (in this case, all to different groups). Thus, all the logical volumes can be set to separate array groups, while main volumes and secondary volumes can also be set to separate array groups.

Figure 29:
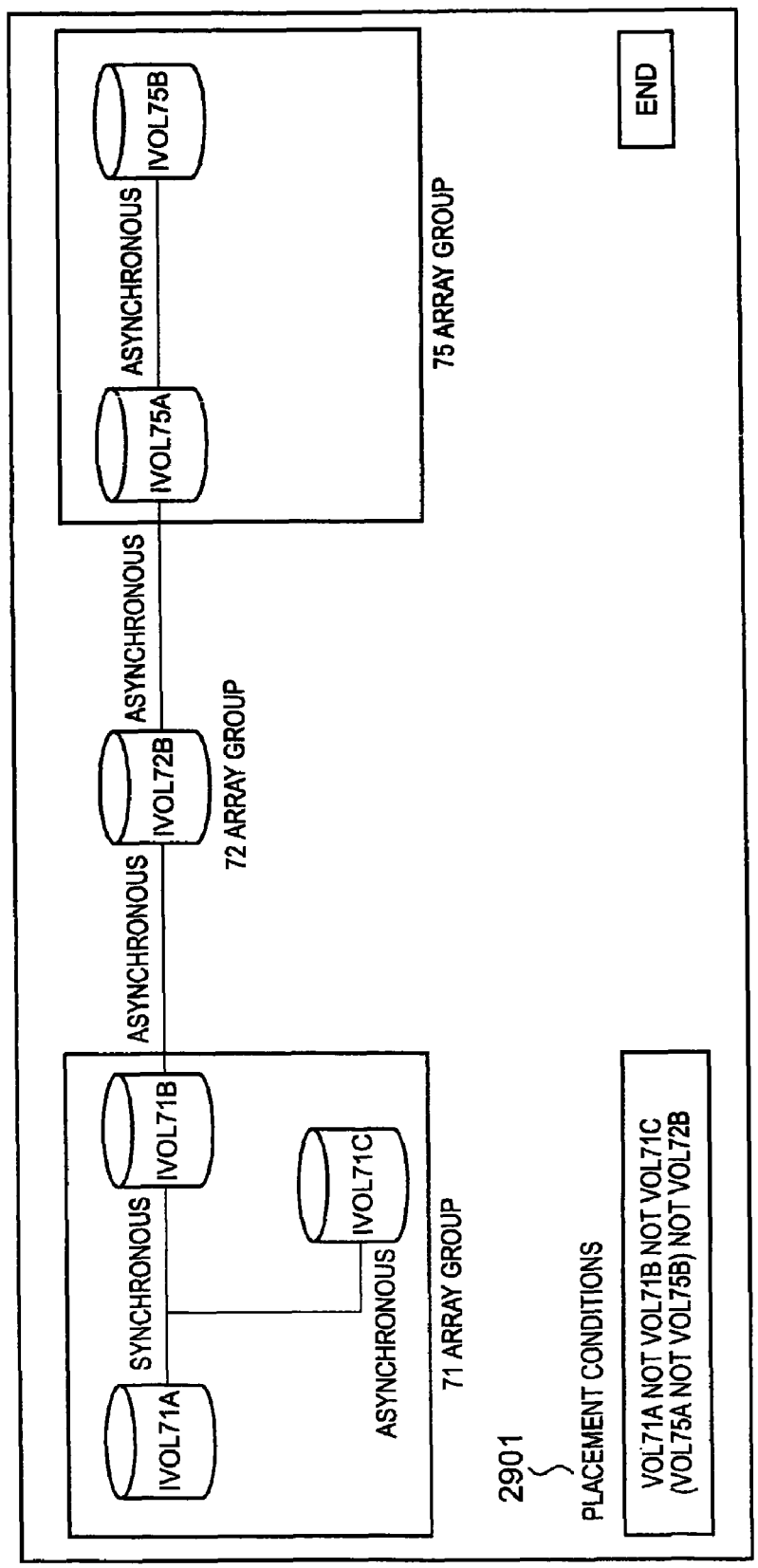
FIG. 29 is a diagram illustrating an example of a settings screen for distribution/placement of data.

In case of a cascade connection of plural logical volumes upon copy designation, the display may look as in FIG. 29.

FIG. 29 illustrates volume copy relationships. The relationships thus displayed are obtained from logical volume relationships on the basis of the copy control table of FIG. 27. For better understanding, logical volumes belonging to a same array group are displayed inside an enclosing line. The figure shows, for instance, that volumes 71A, 71B and 71C, and volumes 75A and 75B belong respectively to a same array group. For better understanding, the array groups to which each volume belongs are also displayed. The administrator sets distribution/placement conditions while observing these copy relationships. On the basis of such a display it becomes possible, for instance, to place volumes 75A and 75B in an array group different from the array group of volume 72B.

FIG. 30 illustrates the process from the placement conditions illustrated in FIGS. 28 and 29 up to migration task setting.

Firstly, in order to create volume groups, the logical volumes are classified and the volume groups are created (S3001) Herein, volume groups are formed based on NOT. That is, in case of 71A NOT 71B NOT 71C and 71A is created as volume group 1, 71B as volume group 2, and 71C as volume group 3. Next, the created volume groups are set in a volume control table on the basis of the placement conditions (S3002). In case of 71A NOT 71B NOT 71C, that means volume group 1 NOT volume group 2 NOT volume group 3.

In this case, volume groups are set to the left and coexistence avoidance volume groups to the right, based on NOT. That is:
Volume group: volume group 1
Coexistence avoidance volume group: volume group 2
Volume group: volume group 2
Coexistence avoidance volume group: volume group 3
In case of (volume group 1 NOT volume group 2) NOT volume group 3:
Volume group: volume group 1
Coexistence avoidance volume group: volume group 2
Volume group: volume group 1
Coexistence avoidance volume group: volume group 3
Volume group: volume group 2
Coexistence avoidance volume group: volume group 3

Next, volume search criteria of the volume groups set in the coexistence avoidance volume groups are set (S3003) This setting is performed on the basis of the attributes of the logical volumes belonging to the volume groups set as the coexistence avoidance volume groups. That is, logical volume attributes are read from a logical volume control table and are taken as search criteria. It is not necessary to set as search criteria all the attributes in the logical volume control table; just one or more attributes maybe pre-set, for instance capacity or capacity and disk type.

Next is created a migration task on the basis of the volume groups set in the coexistence avoidance volume groups and the volume search criteria set in S3003 (S3004). The migration task process is illustrated in FIGS. 20 and 21. Specifically, the migration task can be created through processing with the set volume groups and volume search criteria from S2005.

The process illustrated in FIG. 30, which is performed by the CPU 16, is explained herein as part of the migration task management program 15, but may be a process executed by another program.

Moreover, although in the example explained in FIGS. 27 to 30, the placement conditions are set by the administrator, the placement conditions may also be automatically set by the CPU 16 of the management server 11.

For instance, since primary volumes and secondary volumes are set in the copy control table 2700 in FIG. 27, the primary volumes and the secondary volumes may also be defined so as to be placed in separate array groups. Specifically, if there is a "primary volume NOT secondary volume pre-definition, placement conditions can be automatically created simply through designation by the administrator of a specific copy pair.

The same applies to access frequency. That is, the CPU may specify, from the logical volume control table 700, logical volumes having a high access frequency in a same array group, and pre-define placement conditions so that specified logical volumes involve all different array groups. The placement conditions can be defined in accordance with the number of specified logical volumes, for instance, logical volume A NOT logical volume B, if two logical volumes are specified, logical volume A NOT logical volume B) NOT logical volume C, if three logical volumes are specified.

An access frequency total sum for logical volumes belonging to a same array group can also be obtained, the access frequencies of each subsequent array group can be obtained, the array group having the highest access frequency can be specified, and then each logical volume of the specified array group can be distributed and placed in different array groups. The CPU 16 can perform the processes for determination of an access frequency total sum for logical volumes belonging to a same array group, determination of the access frequencies of each subsequent array group, specification of the array group having the highest access frequency, and distribution and placement of each logical volume of the specified array group. The CPU 16 can identify the logical volumes belonging to a specified array group also by referring to the logical volume control table 700, and can also, as explained above, create distribution/placement conditions on the basis of specified logical volumes.

Also, array groups having a high access frequency and array groups having a low access frequency can be specified, the difference in access frequency (access frequency differential) can be obtained, logical volumes having an access frequency close to this differential can be specified from among high access frequency array groups, and then the data of the specified logical volumes can be migrated to logical volumes of low access frequency array groups. Determination of a difference in access frequency (access frequency differential) and specification of logical volumes having an access frequency close to this differential from among high access frequency array groups can be carried out by the CPU 16. As a result, the CPU 16 can then perform migration of the data of the specified logical volumes to logical volumes of high access frequency array groups, as already explained. The high-access frequency and low-access frequency array groups can be designated by the administrator, while the CPU 16 can determine the access frequency differential, specify the logical volumes for migration, and instruct the storage subsystem to carry out migration. The access frequency of two array groups can be averaged moreover by specifying logical volumes having an access frequency close to ½ of an access frequency difference, not simply an access frequency difference.

What is claimed is:

1. A data migration method for an information processing system comprising a storage system including array groups and a management server, the method comprising:
   supplying, by the storage system, logical volumes based on the array groups;
   setting, by the management server, a migration group including a first one or more of the logical volumes;
   storing, by the management server, a migration condition;
   recording, by the management server, a coexistence avoidance volume group including a second one or more of the logical volumes different from the first one or more of the logical volumes, wherein the coexistence avoidance volume group corresponds to the migration group, and wherein the second one or more logical volumes are a copy of the first one or more logical volumes;
   by the management server, executing to:
      (A) receive a migration indication designating the migration group and the migration condition;
      (B) specify a coexistence avoidance array group including the second one or more of the logical volumes;
      (C) specify one or more migration target logical volumes in one or more array groups excluding the coexistence avoidance array group, based on the migration condition; and
      (D) display the one or more migration target logical volumes as a migration target of the first one or more of the logical volumes.

2. A data migration method according to claim 1,
   wherein the storage system comprises a first storage subsystem supplying an external logical volume and a second storage subsystem supplying the logical volumes, and
   wherein a part of the logical volumes is a virtual volume corresponding to the external logical volume.

3. A data migration method according to claim 2,
   wherein the management server receives another migration indication designating the coexistence avoidance volume group, specifies another one or more migration target logical volumes, and displays the another one or more migration target logical volumes.

4. A data migration method according to claim 3,
   wherein, after reception of the another migration indication, the management server creates a migration task including the second one or more logical volumes and the another one of more migration target logical volumes, and
   wherein the one or more migration target logical volumes specified in process (C) exclude logical volumes which belong to an array group to which the another one or more migration target logical volumes belong, if the specification in process (C) is before the migration of the second one or more logical volumes to the another one or more migration target logical volumes by the migration task.

5. A data migration method according to claim 4,
   wherein the first one or more logical volumes and the second one or more logical volumes are formed copy pairs, and
   wherein the storage system is configured to store data between the first one or more logical volumes and the second one or more logical volumes.

6. A data migration method according to claim 5,
   wherein the storage system is configured to store copy management information indicating the copy pairs, and
   wherein the recording of the coexistence avoidance volume group is based on the copy management information.

7. An information processing system comprising:
   a storage system including array groups and supplying logical volumes based on the array groups; and
   a management server, storing a migration condition, and setting a migration group including a first one or more logical volumes,
   wherein the management server records a coexistence avoidance volume group which includes a second one or more logical volumes different from the first one or more logical volumes, wherein the coexistence avoidance volume group corresponds to with the migration group, and wherein the second one or more logical volumes are a copy of the first one or more logical volumes, and
   wherein the management server:
      (A) receives a migration indication designating the migration group and the migration condition;
      (B) specifies a coexistence avoidance array group the second one or more logical volumes;
      (C) specifies one or more migration target logical volumes in one or more array groups excluding the coexistence avoidance array group based on the migration condition; and
      (D) displays the one or more migration target logical volumes as a migration target of the first one or more logical volumes.

8. An information processing system according to claim 7,
   wherein the storage system comprises a first storage subsystem supplying an external logical volume and a second storage subsystem supplying the logical volumes, and
   wherein a part of the logical volumes is a virtual volume corresponding to the external logical volume.

9. An information processing system according to claim 8,
   wherein the management server receives another migration indication designating the coexistence avoidance volume group, specifies another one or more migration target logical volumes, and displays the another one or more migration target logical volumes.

10. An information processing system according to claim 9,
wherein, after reception of the another migration indication, the management server creates a migration task including the second one or more logical volumes and the another one or more migration target logical volumes, and
wherein the one or more migration target logical volumes specified in process (C) exclude one or more logical volumes which belong to an array group to which the another one or more migration target logical volumes belong, if the specification in process (C) is before the migration of the second one or more logical volumes to the another one or more migration target logical volumes by the migration task.

11. An information processing system according to claim 10,
wherein the first one or more logical volumes and the second one or more logical volumes are formed copy pairs, and
wherein the storage system is configured to copy data between the first one or more logical volumes and the second one or more logical volumes.

12. An information processing system according to claim 11,
wherein the storage system is configured to store copy management information indicating the copy pairs, and
wherein the recording of the coexistence avoidance volume group is based on the copy management information.

13. A management server coupled to a storage system including array groups and supplying logical volumes based on the array groups, comprising:
a memory resource storing a migration condition;
a CPU setting a migration group including a first one or more logical volumes; and
a display device,
wherein the CPU records a coexistence avoidance volume group which includes a second one or more logical volumes different from the first one or more logical volumes, wherein the coexistence avoidance volume group corresponds to the migration group, wherein the second one or more logical volumes are a copy of the first one or more logical volumes, and
wherein the CPU:
(A) receives a migration indication designating the migration group and the migration condition;
(B) specifies a coexistence avoidance array group including the second one or more logical volumes;
(C) specifies one or more migration target logical volumes in one or more array groups excluding the coexistence avoidance array group based on the migration condition; and
(D) displays the one or more migration target logical volumes as a migration target of the first one or more logical volumes, to the display device.

14. A migration server according to claim 13,
wherein the storage system comprises a first storage subsystem supplying an external logical volume and a second storage subsystem supplying the logical volumes, and
wherein a part of the logical volumes is a virtual volume corresponding to the external logical volume.

15. A migration server according to claim 14,
wherein the CPU receives another migration indication designating the coexistence avoidance volume group, specifies another one or more migration target logical volumes, and displays the another one or more migration target logical volumes.

16. A migration server according to claim 15,
wherein, after reception of the another migration indication, the CPU creates a migration task including the second one or more logical volumes and the another one or more migration target logical volumes, and
wherein the migration target logical volumes specified in process (C) exclude one or more logical volumes which belongs to an array group to which the another one or more migration target logical volumes belong, if the specification in process (C) is before the migration of the second one or more logical volumes to the another one or more migration target logical volumes by the migration task.

17. A migration server according to claim 16,
wherein the first one or more logical volumes and the second one or more logical volumes are formed copy pairs, and
wherein the storage system copies data between the first one or more logical volumes and the second one or more logical volumes.

18. A migration server according to claim 17,
wherein the storage system is configured to store copy management information indicating the copy pairs, and
wherein the recording of the coexistence avoidance volume group is based on the copy management information.

* * * * *